United States Patent
DiVerdi et al.

(10) Patent No.: US 10,217,253 B2
(45) Date of Patent: Feb. 26, 2019

(54) METHODS AND APPARATUS FOR SIMULATION OF A STATEFUL BRUSH TIP IN A NATURAL MEDIA DRAWING AND/OR PAINTING SIMULATION

(75) Inventors: Stephen J. DiVerdi, Oakland, CA (US); Yuyan Song, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 1572 days.

(21) Appl. No.: 13/618,861

(22) Filed: Sep. 14, 2012

(65) Prior Publication Data

US 2014/0081610 A1 Mar. 20, 2014

(51) Int. Cl.
G06F 17/50 (2006.01)
G06T 11/20 (2006.01)
G06F 3/0354 (2013.01)

(52) U.S. Cl.
CPC ........ G06T 11/203 (2013.01); G06F 3/03545 (2013.01)

(58) Field of Classification Search
CPC .......................... G06T 11/203; G06F 3/03545
USPC .......................................................... 703/6
See application file for complete search history.

(56) References Cited

U.S. PATENT DOCUMENTS

| | | | |
|---|---|---|---|
| 2002/0085003 A1* | 7/2002 | Nagashima | 345/441 |
| 2010/0182285 A1* | 7/2010 | Tremblay | G06F 3/038 345/179 |
| 2013/0229389 A1* | 9/2013 | DiVerdi et al. | 345/179 |

OTHER PUBLICATIONS

Van Laerhoven et al., "Brush up your painting skills", The Visual Computer, vol. 23, Issue 9-11, Sep. 2007, p. 763-771.*
Tom Van Laerhoven, "An Extensible Simulation Framework Supporting Physically-based Interactive Painting," PhD thesis, University of Limburg, Jun. 21, 2006. pp. 1-171.
Nelson Siu-Hang Chu, "Making Digital Painting Organic," PhD thesis, Hong Kong University of Science and Technology, Aug. 2007. pp. 1-126.
U.S. Appl. No. 13/485,535, filed May 31, 2012, Stephen J DiVerdi.
William Baxter and Naga Govindaraju, Simple Data-Driven Modeling of Brushes, in Proceedings of the 2010 ACM SIGGRAPH symposium on Interactive 3D Graphics and Games (I3D 2010), Association for Computing Machinery, Inc, Feb. 2010. pp. 135-142.
Nelson Chu, William Baxter, Li-Yi Wei, and Naga Govindaraju, Detail-Preserving Paint Modeling for 3D Brushes, in Proceedings of the 8th International Symposium on Non-Photorealistic Animation and Rendering {NPAR 2010), Association for Computing Machinery. Inc., Jun. 7, 2010 pp. 27-34.
Rudolf, D., Mould, D. and Neufeld, E. (Mar. 2005), A Bidirectional Deposition Model of Wax Crayons. Computer Graphics Forum, vol. 24, issue 1: pp. 27-39.

(Continued)

*Primary Examiner* — Dwin M Craig
(74) *Attorney, Agent, or Firm* — Wolfe-SBMC

(57) ABSTRACT

A method, system, and computer-readable storage medium are disclosed for simulation of a stateful brush tip. A tip of a brush tool is modeled using a data structure. A user input is collected representing a stroke made on a virtual canvas with the brush tool. The stroke is made with the tip in a first state. A second state of the tip is determined dependent on the first state of the tip and the user input. The second state represents a different shape of the tip than the first state. The second state of the tip is stored using the data structure.

20 Claims, 19 Drawing Sheets

(56) References Cited

OTHER PUBLICATIONS

Dave Rudolf, David Mould, and Eric Neufeld, Simulating Wax Crayons. In Proceedings of the 11th Pacific Conference on Computer Graphics and Applications, PG '03, 2003 p. 163.
Van Haevre, W., Van Laerhoven, T., Di Fiore, F., and Van Reeth, F. 2007. From Dust till Drawn: A Real-time Bidirectional Pastel Simulation. The Visual Computer, vol. 23 (Nos. 9-11) pp. 925-934, 2007.
U.S. Appl. No. 13/625,331, filed Sep. 24, 2012, Stephen J. Diverdi.
U.S. Appl. No. 13/562,635, filed Jul. 31, 2012, Stephen J. Diverdi.
Stephen DiVerdi, Aravind Krishnaswamy, and Sunil Hadap. Industrial-strength painting with a virtual bristle brush. In Proceedings of the 17th Symposium on Virtual Reality Software and Technology, Hong Kong, Nov. 22-24, 2010, pp. 119-126.
Robert Lansdale, Texture Mapping and Resampling for Computer Graphics. Master's thesis, University of Toronto, 1991. pp. 1-177.
Lance Williams. Pyramidal Parametrics. In Computer Graphics, vol. 17, No. 3, pp. 1-11. Proceedings of SIGGRAPH '83. 1983.
Jonathan Konieczny and Gary Meyer. Airbrush simulation for artwork and computer modeling. In Proceedings of the 7th International Symposium on Non-Photorealistic Animation and Rendering, New Orleans, Aug. 1-9, 2009. pp. 61-69.

\* cited by examiner

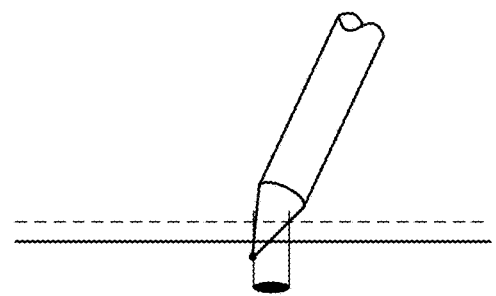
FIG. 8A
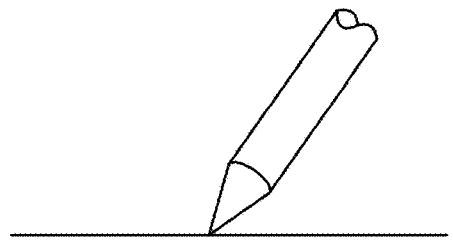 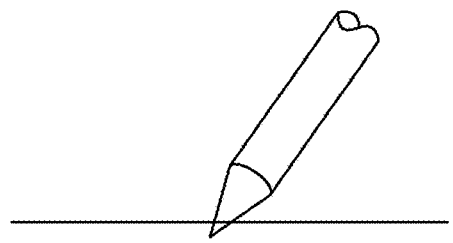
FIG. 8B             FIG. 8C

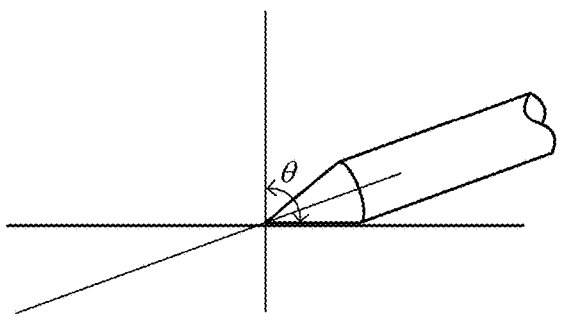
FIG. 12A    FIG. 12B
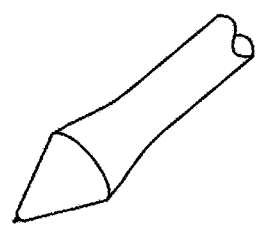
FIG. 12C    FIG. 12D

US 10,217,253 B2

METHODS AND APPARATUS FOR SIMULATION OF A STATEFUL BRUSH TIP IN A NATURAL MEDIA DRAWING AND/OR PAINTING SIMULATION

BACKGROUND

Field of the Invention

The present invention is directed to computer systems; and more particularly, it is directed to the processing of digital images.

Description of the Related Art

Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values. Vector graphics data may be stored and manipulated as one or more geometric objects built with geometric primitives. The geometric primitives (e.g., points, lines, polygons, Bézier curves, and text characters) may be based upon mathematical equations to represent parts of digital images.

Digital image processing is the process of analyzing and/or modifying digital images using a computing device, e.g., a computer system. Using specialized software programs, digital images may be manipulated and transformed in a variety of ways. For example, digital images may be created and/or modified using natural media drawing and/or painting simulation. Natural media drawing and/or painting simulation refers to digital, computer-based creation techniques for creating digital drawings, digital paintings, or other digital works that attempt to mimic real-world techniques and results for drawing (e.g., using a pencil and canvas) and/or painting (e.g., using a brush, palette, and canvas).

The characteristic behaviors of real-world artist tools such as graphite pencils or oil pastels include interaction with the canvas texture, the dirtying of the tip, and the change in shape of the tip over time due to erosion. For example, during a stroke of a pencil on a canvas, a mark is made by pigment breaking off the end of the pencil graphite and becoming embedded in the canvas. Therefore, the consumption of the pigment medium is a fundamental aspect of how the tool behaves. By shaping the tip while stroking and then adjusting the tool pose to take advantage of the new shape, talented artists are able to use this effect to their advantage. For example, an artist might make many broad strokes with a pencil to create a chisel tip and then hold the pencil vertically to make a thin line with the resulting chisel edge. Although some existing digital painting applications support canvas texture and tip dirtying effects, they do not support tip erosion.

SUMMARY

Various embodiments of methods and apparatus for simulation of a stateful brush tip in a natural media drawing and/or painting simulation are described. In some embodiments, a graphics application or image editing application (e.g., a natural media drawing and/or painting application) may provide a brush tool that simulates a pastel, charcoal, crayon, pencil, or any other type of mark making tool that has an erodible tip. In some embodiments, the graphics application or image editing application may maintain the shape of the brush tool from one stroke to another stroke as the shape of the tip changes.

In one embodiment, a tip of a brush tool is modeled using a data structure such as a height map. A user input may be collected representing a stroke made on a virtual canvas with the brush tool. The stroke may be made with the tip in a first state. A second state of the tip may then be determined dependent on the first state of the tip and the user input. The second state may represents a different shape of the tip than the first state. The second state of the tip may be stored using the data structure.

In one embodiment, the brush tip may be automatically restored to a previous state after switching from the brush tool to another tool and back to the brush tool. In one embodiment, the brush tool may be restored to an original, unmodified state using a "sharpen" operation. In one embodiment, one or more worn brush tips may be stored as one or more preset shapes of the brush tool. The brush tool may be restored to a selected one of the preset shapes. If one of the preset shapes is selected for use in the natural media drawing and/or painting application, the sharpen operation may restore the brush tool to the selected preset shape. A worn brush tip may be resized by sampling the height map using linear interpolation.

BRIEF DESCRIPTION OF THE DRAWINGS

FIGS. 8A-8C illustrate stamp generation based on an erodible tip contact area, according to some embodiments.

FIGS. 12A-12D illustrate stylus tilt scaling, according to one embodiment.

Figure 1:
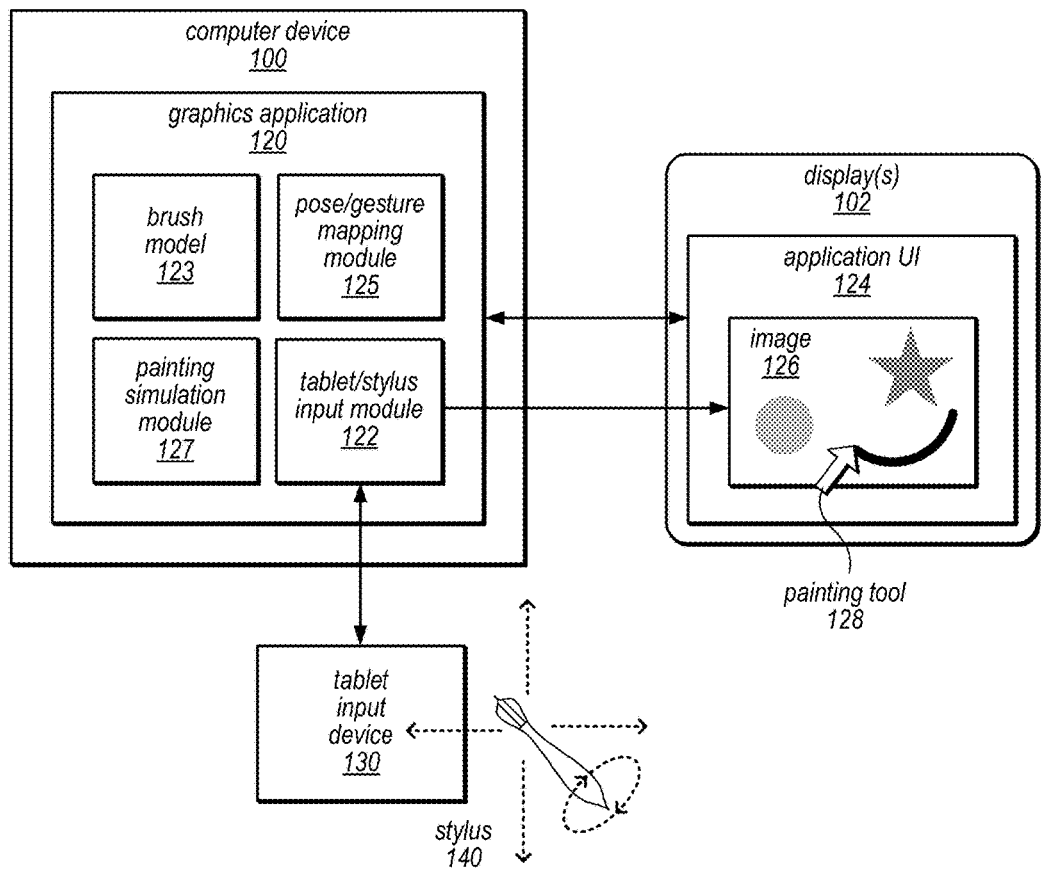
FIG. 1 is a block diagram illustrating one embodiment of a computer device that implements a natural media drawing and painting application employing a tablet and a stylus device, as described herein.

While various embodiments are described herein by way of example for several embodiments and illustrative drawings, those skilled in the art will recognize that embodiments are not limited to the embodiments or drawings described. It should be understood, that the drawings and detailed description thereto are not intended to limit the embodiments to the particular form disclosed, but on the contrary, the intention is to cover all modifications, equivalents and alternatives falling within the spirit and scope of the disclosure. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for simulation of a stateful brush tip (e.g., in a natural media drawing or painting simulation such as a virtual pastel simulation) are described. Various embodiments may provide methods for performing various digital painting and drawing tasks using a natural, posed-based and/or gesture-based approach via a tablet, stylus, and software such as the tablet/stylus input module of the graphics application described herein. Some embodiments may provide detection of stylus gestures that mimic the real-world actions of artists in real (as opposed to digital) painting and drawing. Some embodiments may provide detection of stylus poses that mimic the way in which real-world artists create different effects by manipulating the pose (e.g., the orientation, position, and/or tilt) of a brush, pencil, oil pastel, charcoal, crayon, airbrush, or other natural media vehicle. Some embodiments may perform appropriate digital painting and drawing actions and/or produce appropriate painting and drawing effects in response to detecting the stylus poses and/or gestures. In some embodiments, the erodible tip simulation may lower the cognitive load of the user and allow the user to focus on creativity as opposed to the workings of conventional graphics applications and the user interfaces provided therein. Various embodiments may enable gesture-based natural media painting workflows by providing a set of six degrees of freedom (6DOF) stylus-based gestures and poses for use with a stylus and tablet input technologies, which may be augmented with additional hardware, and by mapping these stylus gestures and poses to painting tasks and effects in a natural media model.

Using a stylus, tablet, and software such as a tablet/stylus input module of a graphics application, such as that illustrated in FIG. 1, some embodiments may collect data from the stylus and/or tablet in response to user manipulation of the stylus and/or tablet to perform various user manipulation tracking tasks. The collected data may include, but is not limited to, acceleration, position, orientation, and proximity data detected for or by the stylus, and touch and pressure data detected for or by the tablet. The collected data may be used to recognize various stylus poses and/or gestures in real-time or near-real time, and the recognized stylus poses and/or gestures may be mapped to appropriate real-world painting and drawing actions that are then simulated in the graphics application as described below.

FIG. 1 illustrates an example graphics workstation or other computing device that is configured to implement the systems and methods described herein, according to various embodiments. As illustrated in this example, the workstation may include, but is not limited to, a computer device 100, one or more displays 102, a tablet input device 130, and a stylus 140. An example computer device which may be used in some embodiments is further illustrated in FIG. 19. As illustrated in this example, computer device 100 may implement a graphics application 120, which may be a natural media painting application, as described herein. Graphics application 120 may include a brush model 123, a painting simulation module 127, a tablet/stylus input module 122, and/or a pose/gesture mapping module 125. In some embodiments, brush model 123 may be a component of painting simulation module 127.

Graphics application 120 may provide a user interface (UI) 124 which may be presented to a user via one or more displays 102. Graphics application 120 may display, for example in a window provided by the UI 124 on the one or more displays 102, an image 126 that a user is currently working on (e.g., either creating or editing). Graphics application 120 may provide a painting or drawing tool 128 that the user may manipulate, for example via tablet 130 and/or stylus 140, to create or edit content in image 126. The tool 128 may, for example, have various modes that emulate a paintbrush, pencil, charcoal, crayon, oil pastel, eraser, airbrush, spray can, and so on. While embodiments are generally described as providing gesture-based manipulations of a paintbrush tool or brush tool, it is to be noted that similar techniques may be applied to other types of painting or drawing tools.

In one embodiment, the painting tool 128 may be implemented as a brush tool using the brush model 123. As used herein, the term "brush tool" is intended to include any suitable tool that simulates the application of pigment on a virtual canvas. In one embodiment, the brush tool may simulate a pastel, charcoal, crayon, pencil, or any other type of mark making tool that has an erodible tip.

Stylus 140 may be configured to be held in a hand of the user and to be manipulated by the user in relation to tablet 130 to perform various image editing operations or other tasks. The user may manipulate stylus 140 and/or tablet 130 in various ways. For example the user may move stylus 140 away from tablet 130 or towards tablet 130; move stylus 140 up and down, left and right, or diagonally and so on in relation to tablet 130; rotate stylus 140 on one or more axes; touch a touch and/or pressure sensitive surface of tablet 130 with stylus 140 and/or with a finger, knuckle, fingernail, etc.; apply varying amounts of pressure to the touch and pressure sensitive surface of tablet 130 with a finger or stylus 140; move the tip of stylus 140 on the touch and pressure sensitive surface of tablet 130; and so on. Tablet 130 is configured to detect the various manipulations performed by the user with stylus 140 and/or with a finger, knuckle, etc. on the surface of tablet 130 and communicate information regarding the manipulations to tablet/stylus input module 122 on computer device 100, for example via a wired or wireless interface.

Tablet/stylus input module 122 may be implemented as a component or module of application 120, as a library function, as a driver, or as some other software entity. Tablet/stylus input module 122 may be implemented in software, in hardware, or as a combination of hardware and software. Graphics application 120, via tablet/stylus input module 122, may interpret the information regarding the manipulations to detect various gestures and to perform various painting actions in response to the detected gestures for creating or editing content of image 126. For at least some of those actions, painting tool 128 may be appropriately moved, modified, and/or otherwise affected on display 102. Various examples of gestures that may be detected are listed below, as are various examples of painting actions that may be invoked and/or controlled by such stylus gestures.

In some embodiments, software and/or hardware on tablet 130 may perform at least some of the functionality of detecting various gestures. Thus, in some embodiments, tablet 130 may be configured to detect gestures and communicate the detected gestures to graphics application 120, which then performs the appropriate painting actions in response to the gestures. In other embodiments, tablet 130 may only collect information regarding gestures and communicate the gestures to application 120 via tablet/stylus input module 122; tablet/stylus input module 122 may perform the function of detecting the gestures from the information and communicating the gestures to application 120, or to other modules of application 120, which then performs the appropriate painting actions in response to the gestures.

Graphics application 120 may include a brush model 123. In one embodiment, the brush model 123 includes a bristle-based brush model in which the brush consists of a set of bristles that dynamically change shape in response to the physics of the brush stroke. In contrast, a single two-dimensional (2D) grayscale stamp is typically used by conventional digital painting programs. In one embodiment, the brush model 123 includes a data structure such as a height map that models an erodible tip of a brush tool.

Graphics application 120 (e.g., in the painting simulation module 127) may include support for "wet" and/or "dirty" paint, i.e., support for bidirectional paint transfer (e.g., from the brush to the canvas, and from the canvas to the brush), which enables color blending and smudging in a way that mimics natural paint media. Bidirectional paint transfer is in contrast to a unidirectional paint transfer (e.g., the transfer of paint from brush to canvas only, without dirtying the brush) that is typically used in conventional digital painting programs.

Graphics application 120 (e.g., in the painting simulation module 127) may simulate watercolor painting, which creates the effects of a brush wet with watery paint that slowly dries during a stroke. Conventional paint programs typically do not simulate these secondary effects, although some may use additional tools and textures to create similar results.

Figure 2:
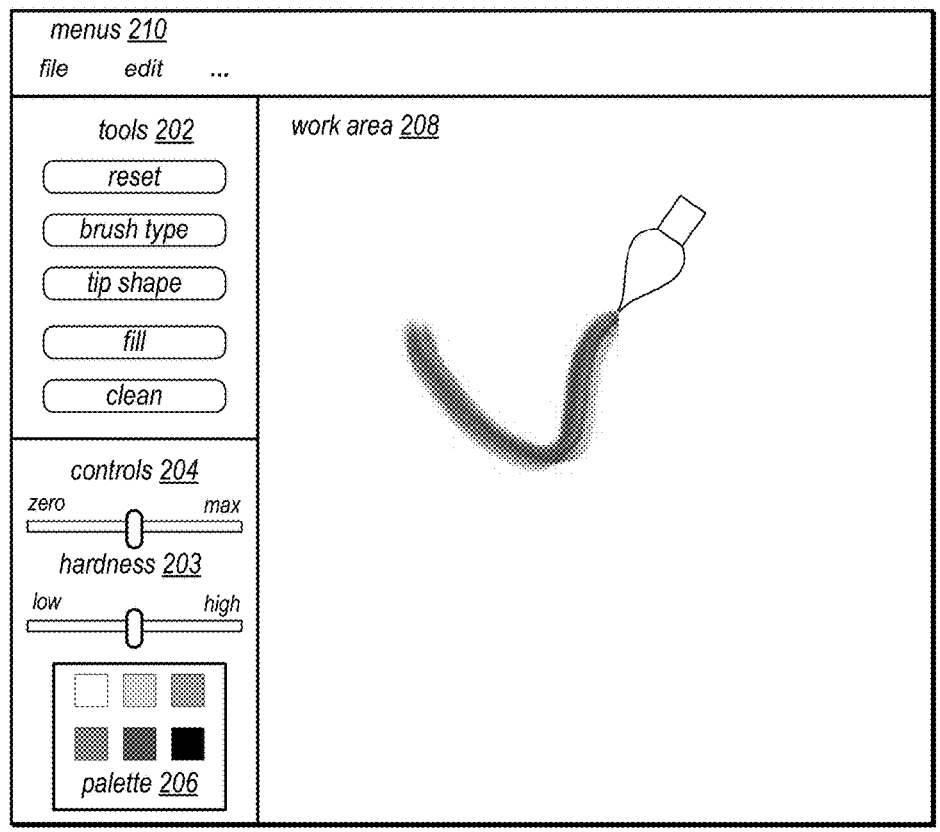
FIG. 2 is a block diagram illustrating a display on which a user interface to a graphics application may be implemented, according to some embodiments.

FIG. 2 illustrates an example display 200 on which a user interface to a graphics editing module, such as image editing operations module of graphics application 120 may be implemented, according to one embodiment. In this example, the display is divided into four regions or areas: menus 210, tools 202 (which may include a "fill" tool, a "clean" tool, a "tip shape" selection tool, and/or a brush type selection tool), controls 204 (which may include palette 206 and hardness selection tool 203), and work area 208. Tools 202 may include one or more user-selectable user interface elements. In this example, it is this area that contains the user interface elements that a user may select to apply various effects to the image. For example, the user may select a type of brush tool (using the brush type selection tool) and/or a tip shape (using the tip shape selection tool) for use in applying pigment to an image being created and/or edited in work area 208. Other optional tools may be selected as well, such as an eraser or reset function, in some embodiments. While FIG. 2 shows some of the elements in tools area 202 as buttons, other types of user interface elements, such as pop-up or pull-down menus, may be used to select from among one or more tools in various embodiments. For example, in one embodiment, the brush type selection mechanism and/or the tip shape selection mechanism illustrated in tools area 202 may be implemented using a pop-up or pull-down menu to select a brush type (e.g., a paintbrush, pencil, charcoal, crayon, oil pastel, eraser, airbrush, spray can, and so on) and/or a tip shape (e.g., point, flat, round, square, triangle, and so on). As noted above, the reset and eraser tools are optional, and thus may or may not be included on the user interface in various embodiments. Various embodiments may include other tools not shown as well, such as an "undo" tool that undoes the most recent user action in the work area 208.

In this example, controls 204 may include one or more user-modifiable controls, such as slider bars, dials, pop-up menus, alphanumeric text entry boxes, etc., for specifying various parameters of the painting functions to be applied to an image (e.g., using the brush tool). In this example, two slider bars are provided to specify different values (or relative values) of configurable parameters of a painting function, one of which is usable to specify a hardness parameter value (203), e.g., for a pencil or other erodible mark making tool. In various embodiments, slider bars may also be used to specify an amount of ink, a pigment concentration amount, a transparency value, a brush width, a bristle stiffness, or other parameters that are to be applied when using the brush tool to "paint" or "draw" on the image being created or edited in work area 208. Various methods of specifying values of any of the other parameters used in simulating painting effects (i.e., methods other than those illustrated in FIG. 2) may be used in other embodiments. In some embodiments, slider bars or another input mechanism in controls area 204 may be used to specify one or more threshold distance values for use with proximity based gestures and their corresponding functions in the graphics application, or a deposition threshold amount. In some embodiments, slider bars or another input mechanism in controls area 204 may be used to specify a zoom level for an automated zoom function or to override a default zoom level for such a function.

In the example illustrated in FIG. 2, menus 210 may include one or more menus, for example menus used to navigate to other displays in the graphics application, open files, print or save files, undo/redo actions, and so on. In this example, work area208 is the area in which an image being created or edited is displayed as graphics editing operations are performed. In various embodiments, work area 208 may display a portion or all of a new image to which paint or other natural media is to be added, or a portion or all of a previously existing image being modified by adding paint, as described herein. In the example illustrated in FIG. 2, work area 208 of FIG. 2 illustrates an image in progress.

Some embodiments of a painting simulation module, such as painting simulation module 127 described herein, may employ a brush model (such as brush module 123) that simulates a brush tip and the notion of the paint being held in the brush tip and deposited on a canvas during strokes. In some embodiments, during the act of stroking with the brush, the brush's paint load will be depleted, eventually running out, and the brush may dirty, picking up paint from the canvas, as with a real brush. Clean and fill actions may be provided to allow the user to manage the paint load between strokes for the desired stroke effect. The user interface illustrated in FIG. 2 also includes a color palette whereby a user may manually load a brush with paint if and when desired, and a "fill" user interface element (shown as a radio button) whereby a user may enable or disable an auto fill option.

Figure 3:
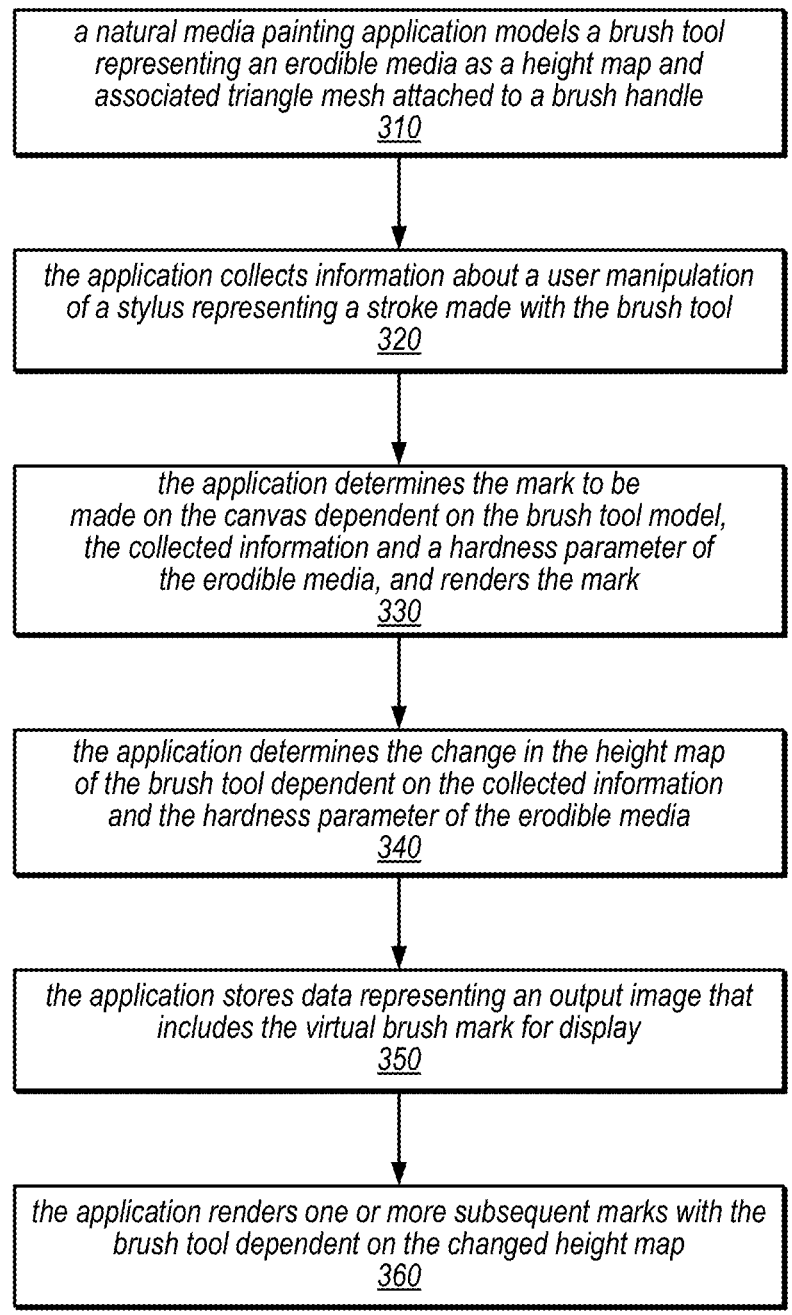
FIG. 3 is a flow diagram illustrating one embodiment of a method for creating a mark in a natural media painting application using a virtual brush tool modeled with an erodible tip.

In some embodiments, graphics application 120 may simulate the shape-changing property of a pastel, charcoal, crayon, or pencil, or any other type of mark making tool that has an "erodible tip." One embodiment of a method for creating a mark in a natural media painting application using a virtual brush tool modeled with an erodible tip is illustrated in FIG. 3. The method shown in FIG. 3 may be used in conjunction with embodiments of the computer system shown in FIG. 19, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

As shown in 310, a natural media painting application may model a brush tool representing an erodible media as a height map and an associated triangle mesh attached to a brush handle. As shown in 320, the application may collect or receive information about a user manipulation of a stylus representing a stroke made with the brush tool. As shown in 330, the application may determine the mark to be made on the canvas dependent on the brush tool model, the collected information, and a hardness parameter of the erodible media, and the application may render the mark.

As shown in 340, the application may determine the change in the height map of the brush tool dependent on the collected information and the hardness parameter of the erodible media. As shown in 350, the application may store data representing an output image that includes the virtual brush mark for display. As shown in 360, the application may render one or more subsequent marks with the brush tool dependent on the changed height map.

Figure 4:
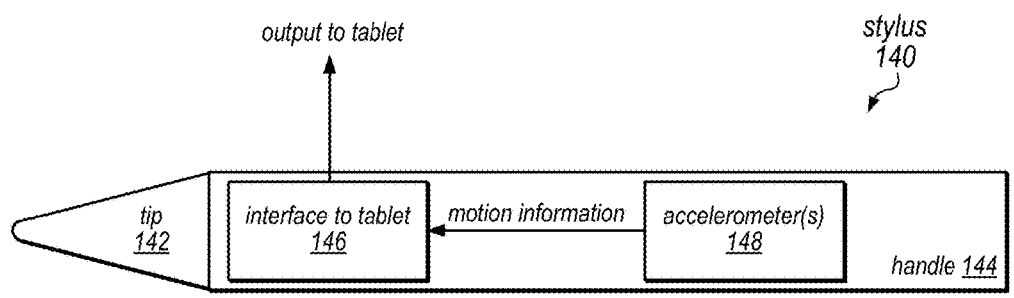
FIG. 4 illustrates various components of an example stylus, according to some embodiments.

FIG. 4 illustrates components of an example stylus 140 according to some embodiments. Stylus 140 may generally be described as having a tip 142 and a handle 144. Note that a stylus 140 may be provided with two tips instead of one as shown in FIG. 4. Stylus 140 may include one or more accelerometers 148 and/or other components for sensing movement metrics including but not limited to spatial (location), directional, and acceleration metrics. This motion information may be communicated to a tablet, such as tablet 130 shown in FIG. 1, via an interface 146. Interface 146 may typically be a wireless interface, although wired interfaces are also possible.

In some embodiments, the natural media painting application may employ a brush model that simulates the use of a brush, such as one represented by a brush tool that is manipulated using a stylus. In such embodiments, realistic brush behavior may be simulated in the painting application. In one embodiment, the brush behavior may be simulated substantially in real-time to deposit ink or paint onto a virtual canvas. In some embodiments, a brush model may include a large set of discrete bristles. The bristles may comprise "virtual" bristles and may also be referred to as bristle representations. The simulated behavior of the brush may result in continuous strokes created by sweeping individual bristles into quadrilaterals. The brush model and brush behavior simulation may model the change of the shape of a brush tip during a stroking motion and the deposition of paint or ink resulting from the motion. In some embodiments, by computing the effect of each bristle independently of other bristles, a faithful reproduction of how a real brush deposits paint or ink and changes shape during a stroke may be achieved.

Stylus gestures that may be detected by a natural media painting application in various embodiments may include, but are not limited to: a barrel rotation (a twisting motion about the major axis of the stylus), a fanning motion (waving the stylus tip back and forth above the tablet), mashing down (pressing the stylus into the tablet with high pressure), a jerk up (a quick motion away from the tablet), a jerk down (a quick motion toward the tablet), shaking away from the tablet (holding the stylus by its end and flicking the wrist); an shaking toward the tablet (holding the stylus its end and flicking the wrist). At least some of the stylus gestures that may be detected may be performed using a stylus augmented with one or more accelerometers, and possibly other hardware and/or software, for collecting motion and other data to be used in gesture recognition.

Figure 5A:
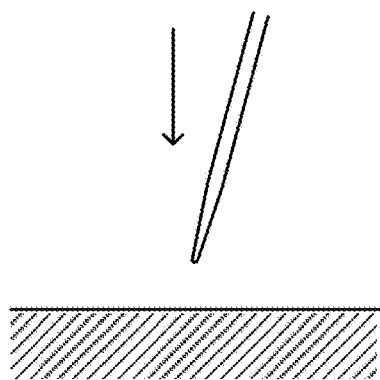
FIGS. 5A-5D illustrate various stylus poses and gestures that may be recognized by an interface module of a natural media painting application, according to various embodiments.
Figure 5B:
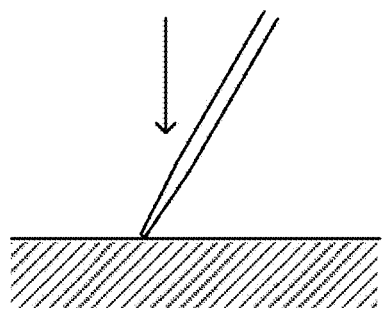
Figure 5C:
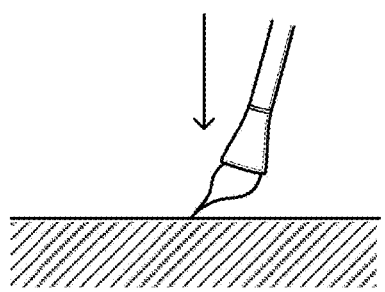
Figure 5D:
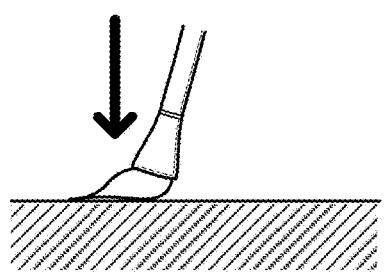
Figure 6A:
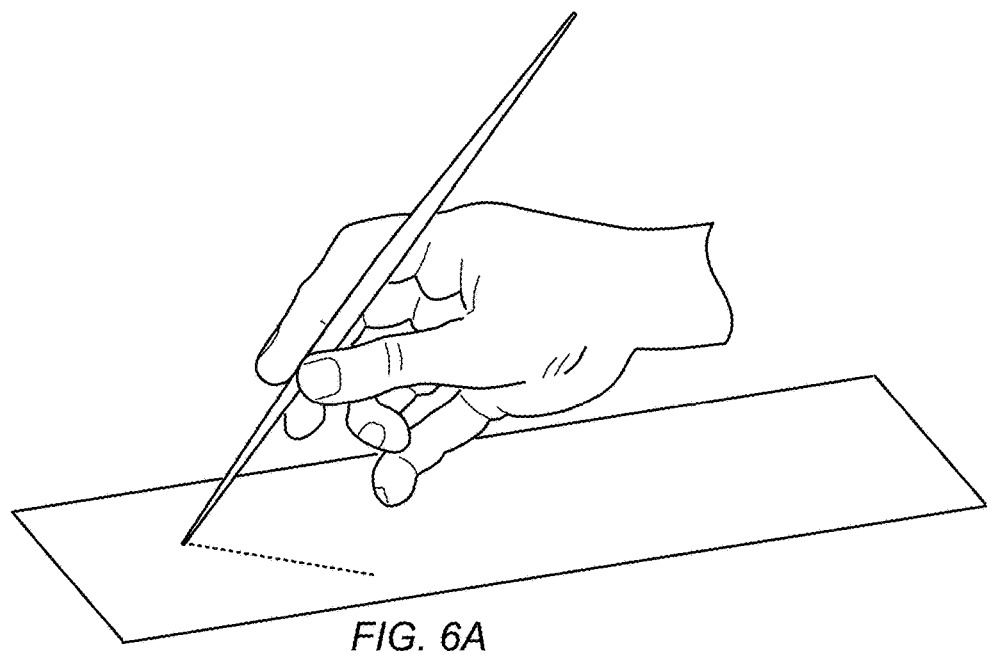
FIGS. 6A-6B illustrate examples of various stylus poses during strokes made on a tablet, according to some embodiments.
Figure 6B:
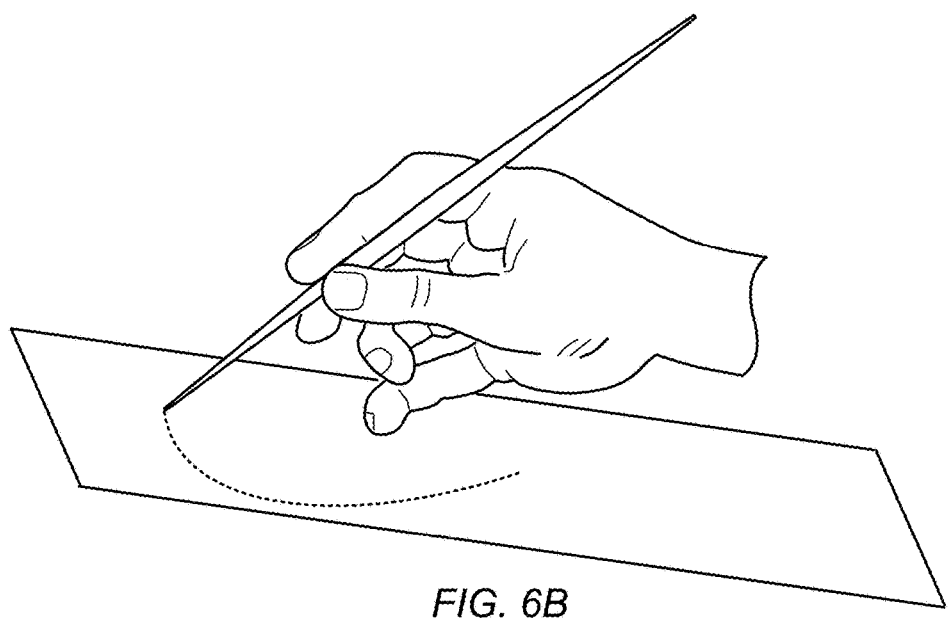

In some embodiments, a natural media painting application may detect and recognize various stylus poses, and the pressure with which a stylus touches a tablet, and these inputs may be used to create and control various painting/drawing effects, such as those described herein. Some of the stylus poses and actions that may be recognized by an interface module of a natural media painting application, such as tablet/stylus input module 122 in FIG. 1, are illustrated in FIGS. 5A-5D, according to various embodiments. For example, FIG. 5A illustrates a stylus which is in proximity to and being moved toward a canvas and that is being held at an angle of less than 45°. FIG. 5B illustrates a stylus that is being pressed into a canvas and that is being held at an angle greater than 45°. 5C and 5D illustrate the effects of different stylus gestures on a brush model. For example, FIG. 5C illustrates the effect of a stylus gesture that corresponds to pressing a bristle brush lightly on a canvas, while FIG. 5D illustrates the effect of a stylus gesture that corresponds to mashing a bristle brush down into a canvas. In general, tablet/stylus input module 122 may be configured to recognize a wide variety of stylus poses and gestures by detecting manipulation of the stylus from an initial pose (e.g., an initial position and orientation) using six degrees of freedom (6DOF) (e.g., detecting movement in a given direction in three dimensions, rotation about an axis in any dimension, pitch, roll, yaw, etc.) As described herein, this 6DOF information may be augmented with information collected from an accelerometer, various proximity sensors, a touch and/or pressure sensitive tablet device, or other input mechanisms to define a stylus gesture that is mapped to an action to be taken in a natural media painting application, and the action mapped to the gesture may be dependent on a work mode and/or context in which the stylus gesture was made. Similarly, FIGS. 6A and 6B illustrate a user holding a stylus in different poses while making various painting/drawing strokes on a tablet.

As previously noted, the characteristic behaviors of artist tools such as graphite pencils or oil pastels include interaction with canvas texture, dirtying of tip, and change in shape of tip over time due to erosion. In some embodiments, the natural media painting applications described herein may supplement these and/or other features by supporting the simulation of an erodible tip for various brush models. In such embodiments, when combined with full 6DOF tablet stylus input, the same range of motion employed by real-world artists using pencils, charcoal, or oil pastels, for example, may be possible. In other words, a virtual brush that supports the simulation of an erodible tip (i.e., that mimics the same type of shape changing behavior) in a digital painting application may provide artists with a real artistic tool, such that trained artists may be able to achieve substantially the same results with a digital painting tool.

As previously noted, in some embodiments, the painting application described herein may model an erodible tip as a height map and an associated triangle mesh attached to the end of a brush handle. The height map resolution may be a controllable parameter determined by the brush size and the performance limitations. While arbitrary height map shapes may be possible, in some embodiments, the application may generally support brushes with a cylindrical, square, or triangle base. To create a smooth silhouette of the height map around the base, the application may move the vertices outside the base to the perimeter. The application may then add faces connecting the edges of the height map to the base of the brush handle to create a tip volume. In some embodiments, the application may support a variety of initial tip shapes, including, but not limited to "pointed," "flat," "rounded," "square," and "triangle" shaped tips.

Figure 7A:
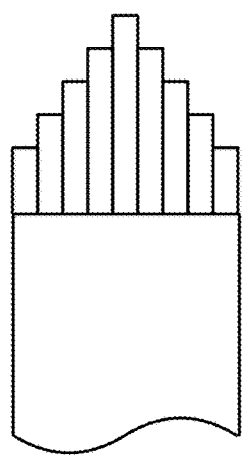
FIGS. 7A-7J illustrate various embodiments of a virtual brush with an erodible tip model.
Figure 7B:
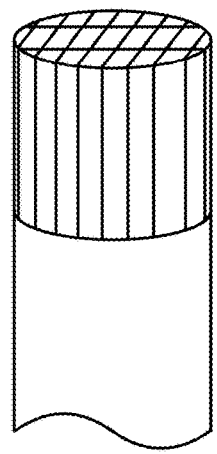
Figure 7C:
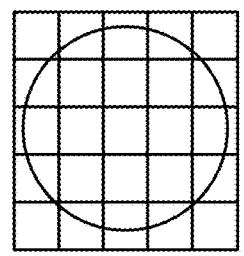
Figure 7D:
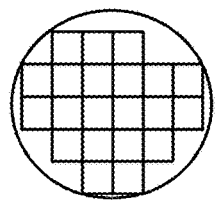
Figure 7E:
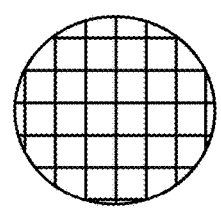
Figure 7F:
Figure 7G:
Figure 7H:
Figure 7I:
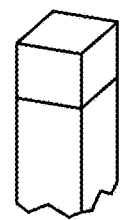
Figure 7J:

FIGS. 7A-7J illustrate various embodiments of a virtual brush with an erodible tip model. For example, FIG. 7A illustrates a side view of a brush model, including a cross section of a portion of the handle and a slice of the height map at the tip. FIG. 7B illustrates an isometric view of a brush model, including the tip mesh and a portion of the handle. In this example, the tip is flat, as illustrated by the height map of the tip. FIG. 7C illustrates the top view of the height map and handle cross section. FIG. 7D illustrates an aliased silhouette of the height map. FIG. 7E illustrates a smoothed silhouette of the height map. FIGS. 7F-7J illustrate brush models with erodible tips of different shapes, including pointed (7F), flat (7G), rounded (7H), square (7I), and triangular (7J).

In some embodiments, to determine the instantaneous 2D stamp that corresponds to the contact area between the posed erodible tip and the canvas, the application may implement the following algorithm. First, given the pose of the height map, the closest point to the canvas may be determined. The height at which this point is in contact with the canvas may be mapped to pressure p=0. To simulate the effect of increased pressure resulting in a larger contact area (due to canvas deformation), as p→1, the height may be lowered so that the closest point can penetrate the canvas by up to some pre-determined maximum amount.

In some embodiments, a 2D stamp may be determined by the erodible tip geometry that is below a pre-determined deposition threshold, which is defined as a small height above the canvas. CPU triangle rasterization with per-pixel depth clipping may be used to create the stamp image.

In some embodiments, to create higher quality marks, the intensity of each pixel in the stamp may be modulated by how deeply the pixel passes the deposition threshold. For example, a pixel that has depth right at the deposition threshold may have intensity just above zero, while a pixel that has maximum depth may have maximum intensity. However, the depth-intensity relationship may not necessarily be linear, in different embodiments.

FIGS. 8A-8C illustrate stamp generation based on an erodible tip contact area, according to some embodiments. For example, FIG. 8A illustrates a portion of tip that passes below a deposition threshold (which is represented by the dotted line), and the resulting stamp that is generated based on the amount of the tip that passed below the deposition threshold. In FIG. 8A, the solid dot at the end of the tip is the nearest point to the canvas. FIG. 8B illustrates an erodible tip in contact with the canvas with pressure=0. FIG. 8C illustrates an erodible tip in contact with the canvas with pressure=1 (i.e., the maximum value).

Figure 9:
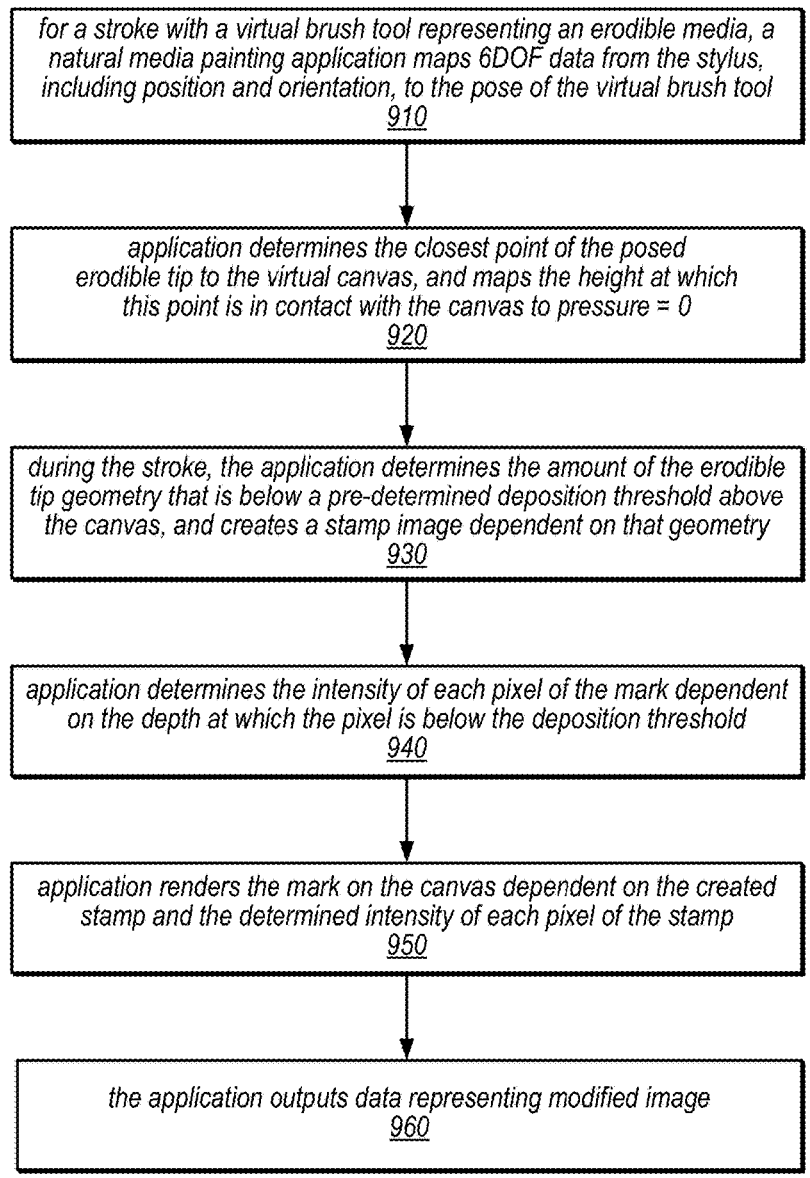
FIG. 9 is a flow diagram illustrating one embodiment of a method for stamp generation a natural media painting application.

FIG. 9 is a flow diagram illustrating one embodiment of a method for stamp generation a natural media painting application. The method shown in FIG. 9 may be used in conjunction with embodiments of the computer system shown in FIG. 19, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

As shown in 910, for a stroke with a virtual brush tool representing an erodible media, a natural media painting application may map 6DOF data from the stylus, including position and orientation, to the pose of the virtual brush tool. As shown in 920, the application may determine the closest point of the posed erodible tip to the virtual canvas, and the application may map the height at which this point is in contact with the canvas to pressure=0. As shown in 930, during the stroke, the application may determine the amount of the erodible tip geometry that is below a pre-determined deposition threshold above the canvas, and the application may create a stamp image dependent on that geometry. As shown in 940, the application may determine the intensity of each pixel of the mark dependent on the depth at which the pixel is below the deposition threshold. As shown in 950, the application may render the mark on the canvas dependent on the created stamp and the determined intensity of each pixel of the stamp. As shown in 960, the application may output data representing a modified image that includes the mark, e.g., for storage and/or display.

In some embodiments, the erodible tip model may also include a "hardness" parameter (whose value may be user-configurable), which may capture the variations in behaviors from soft (8B) to hard (H8) graphite pencils, for example. In general, hard tips may have a maximum canvas penetration that is shallower than that of soft tips, because even with high pressure, hard pencils may not make large marks, whereas high pressure applied to soft pencils typically does. Also, high pressure on a hard pencil may not create a very dark mark, whereas high pressure on a soft pencil typically creates a darker mark. In some embodiments, these effects may be achieved in the digital painting application through the use of the aforementioned depth-intensity mapping.

In some embodiments, a hardness parameter may also used to affect how pressure interacts with the influence of canvas texture. For example, for both soft and hard tips, low pressure strokes may be highly influenced by canvas texture because the tip may just graze the crests of the canvas without significantly deforming the canvas or the tip. Under high pressure, however, soft tips may quickly deform to fill in the canvas valleys, while hard tips may still have varying deposition, as they tend to skip across canvas valleys. Therefore, the influence of canvas texture on the output stroke may be modulated by tip hardness.

One feature of an erodible tip is the actual change in tip shape over the course of a stroke. In some embodiments, to create this behavior in the digital painting application, at each step the mesh vertices that are in contact within the canvas (i.e., below the deposition threshold) may be reduced in height by some amount. In some embodiments, the erosion rate may be based on data that has been empirically determined, e.g., by measuring the change in length of pencil tips after stroking at constant pressure over a large distance. In one example, measurements may be made for low, medium, and high pressure, for pencils of hardness from 8B to 8H, for strokes one meter long. Based on this data, a value of erosion per distance may be computed for 9 combinations of pressure (low, medium, high) and hardness (soft, medium, hard) and stored in a table. Continuously varying values may then be interpolated from this table. Similar tables may be constructed for other media using measurements or by extrapolating from the pencil data, in different embodiments.

In some embodiments of the digital painting application, at each step of a stroke, the pressure and the hardness may be used to look up an erosion rate, which may be combined with the distance traveled since the last step to compute the volume of pigment eroded. This volume may be distributed among the vertices in contact with the canvas, which may be reduced in height correspondingly to remove the computed volume. In some embodiments, to conserve the total volume of the tip material so that it does not run out after many strokes, the removed volume may be added back into the tip model at the base of the volume, e.g., keeping the total volume constant.

Figures 10A, 10B:
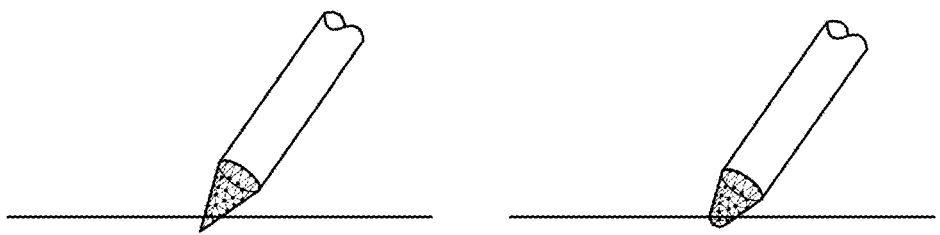
FIGS. 10A-10B illustrate the erosion of an erodible tip during a stroke, according to some embodiments.

FIGS. 10A-10B illustrate the erosion of an erodible tip during a stroke, according to some embodiments. For example, FIG. 10A illustrates an erodible tip (modeled as a mesh) for which several of the vertices are below the canvas (or deposition threshold), prior to erosion. FIG. 10B illustrates the same tip following the erosion of the tip at the vertices that were below the canvas (or deposition threshold).

Figure 11:
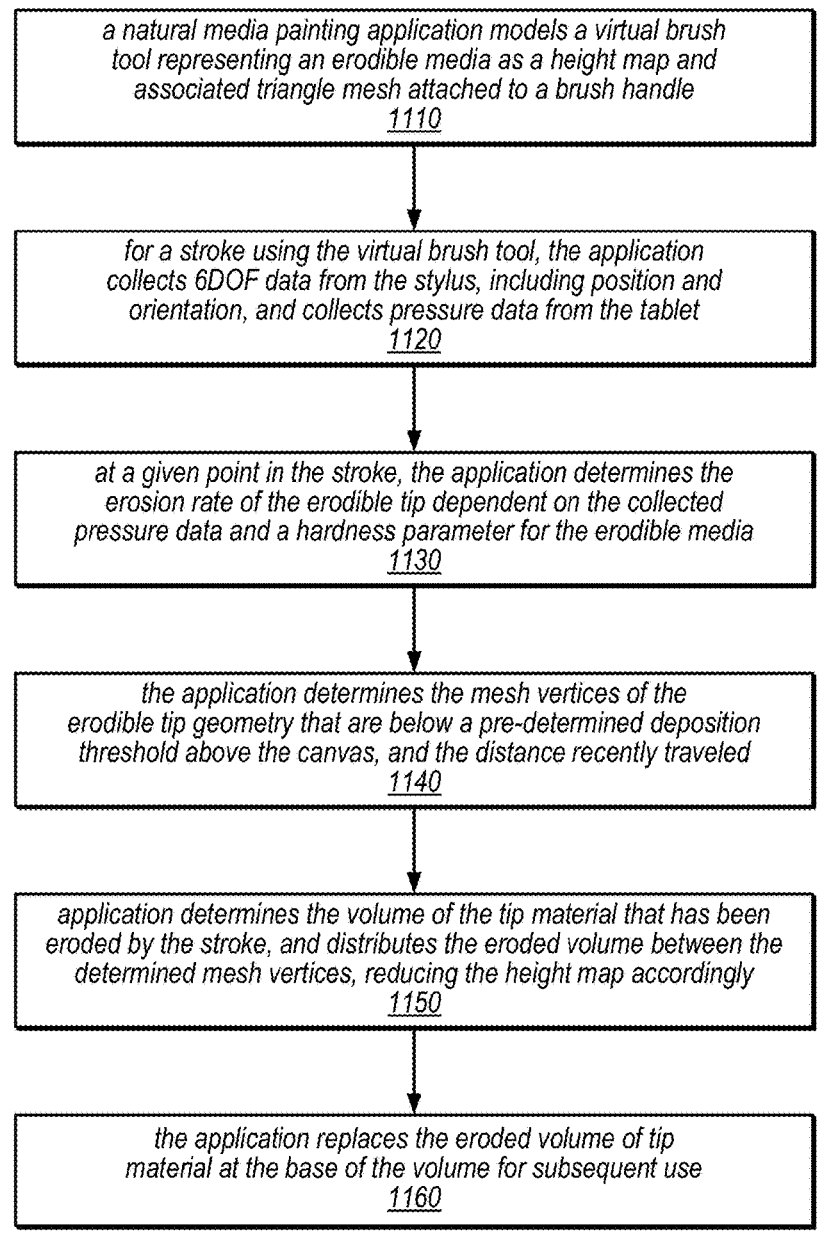
FIG. 11 is a flow diagram illustrating the use of an erodible tip in a natural media painting application, according to some embodiments.

FIG. 11 is a flow diagram illustrating the use of an erodible tip in a natural media painting application, according to some embodiments. The method shown in FIG. 11 may be used in conjunction with embodiments of the computer system shown in FIG. 19, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

As shown in 1110, a natural media painting application may model a virtual brush tool representing an erodible media as a height map and an associated triangle mesh attached to a brush handle. As shown in 1120, for a stroke using the virtual brush tool, the application may collect 6DOF data from the stylus, including position and orientation information, and the application may also collect pressure data from the tablet. As shown in 1130, at a given point in the stroke, the application may determine the erosion rate of the erodible tip dependent on the collected pressure data and a hardness parameter for the erodible media. As shown in 1140, the application may determine the mesh vertices of the erodible tip geometry that are below a pre-determined deposition threshold above the canvas, and the application may also determine the distance recently traveled. As shown in 1150, the application may determine the volume of the tip material that has been eroded by the stroke, and the application may distribute the eroded volume between the determined mesh vertices, reducing the height map accordingly. As shown in 1160, in some embodiments, the application may replace the eroded volume of tip material at the base of the volume for subsequent use.

Another aspect of the way artists use pencils or pastels is that they may hold the tool at a shallow angle, which allows the side of the tip to be completely in contact with the canvas, creating a broad mark, such as the type frequently used for shading. Pointed tips are most commonly used for this. A pointed tip is generally very sharp, allowing tilt angles of up to 80°. However, some tablet styluses such as the Wacom Intuos unit have maximum tilt angles in the range of 60°, with the maximum achievable tilt being more like 50° (due to the physical form factor of the stylus). A pencil tip with a peak angle of 40° would be needed to make it possible for an artist to maximally tilt the stylus and make the broad side of the tip contact the canvas, which would not be very similar to real pencils.

In some embodiments, to achieve a shading effect as described above, the application may apply scaling to the input tilt data so that, at the maximum stylus tilt T, the broad side of the virtual erodible tip is flush with the virtual canvas, regardless of the peak angle of the tip and the tilt limitations of the tablet. In some embodiments, this may be done by computing the maximum necessary tilt based on the tip's peak angle E, and then applying a linear scale from input tilt t to scaled tilt t', as follows:

$$t' = \frac{90 - \frac{E}{2}}{T} t \qquad (1)$$

FIGS. 12A-12D illustrate stylus tilt scaling, according to one embodiment. For example, FIG. 12A illustrates the tip of a #2 pencil, for which the peak angle (E) is about 10°. FIG. 12B illustrates a flush pose of a pencil for making broad strokes. In FIG. 12B, the corresponding maximum tilt θ is calculated as in equation (1) above. FIG. 12C illustrates a Wacom stylus, which has a much higher peak angle. FIG. 12D illustrates that the maximum tilt of the stylus (T) is typically about 50°. In some embodiments, the techniques described herein may be used to map the maximum tilt of the stylus (as in 12D) to the maximum tilt of a pencil (as in 12B).

Figure 13:
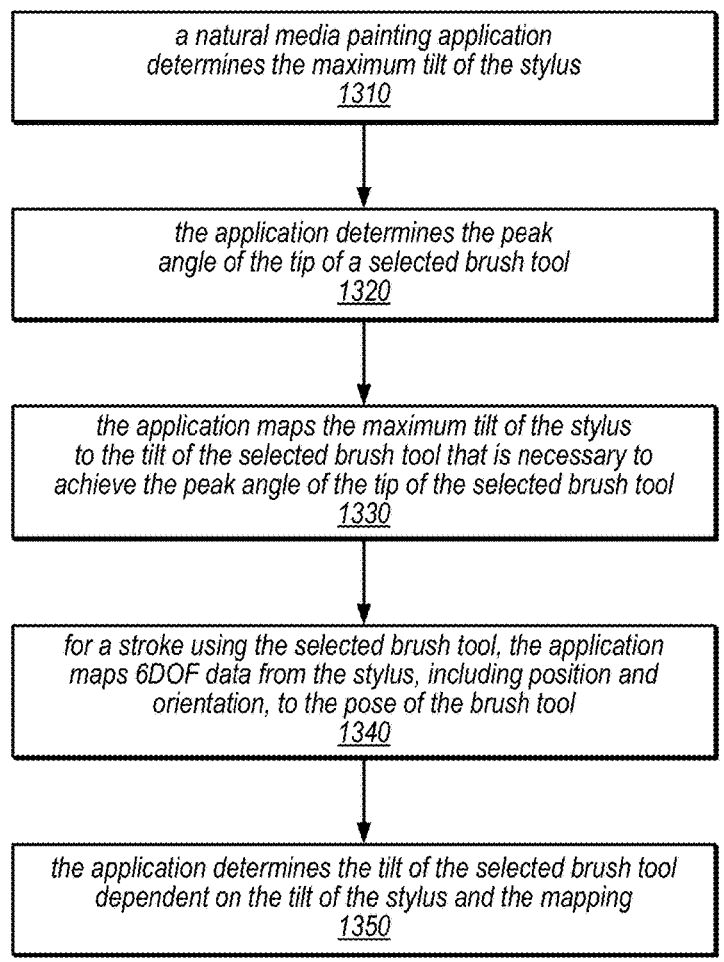
FIG. 13 is a flow diagram illustrating one embodiment of a method for scaling the tilt of a stylus in natural media painting application.

FIG. 13 is a flow diagram illustrating one embodiment of a method for scaling the tilt of a stylus in natural media painting application. The method shown in FIG. 13 may be used in conjunction with embodiments of the computer system shown in FIG. 19, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

As shown in 1310, a natural media painting application may determine the maximum tilt of the stylus. As shown in 1320, the application may determine the peak angle of the tip of a selected brush tool. As shown in 1330, the application may map the maximum tilt of the stylus to the tilt of the selected brush tool that is necessary to achieve the peak angle of the tip of the selected brush tool. As shown in 1340, for a stroke using the selected brush tool, the application may map 6DOF data from the stylus, including position and orientation, to the pose of the brush tool. As shown in 1350, the application may determine the tilt of the selected brush tool dependent on the tilt of the stylus and the mapping.

Other digital painting applications have attempted to create a simulation of an erodible colored pencil. However, these applications generally employ a much more computationally expensive approach than the approach described herein, such that their approach cannot be easily integrated into existing pixel painting pipelines. Other existing simulations of erodible media do not directly simulate the erodible tip, do not change due to tip erosion, and/or do not support varying hardness.

In some embodiments, the techniques described herein may be used to achieve realistic pastel and pencil simulation of high quality with low computational requirements, when compared to previous approaches. The techniques described herein may also provide greater and more intuitive support for tablet stylus input, e.g., using 6DOF pose mapping and tilt scaling.

In one embodiment, the painting tool 128 may be implemented as a brush tool using the brush model 123. As used herein, the term "brush tool" is intended to include any suitable tool that simulates the application of pigment on a virtual canvas. In one embodiment, the brush tool may simulate a pastel, charcoal, crayon, pencil, or any other type of mark making tool that has an erodible tip. In one embodiment, the brush tool may simulate a bristle tip with plasticity (i.e., a bristle tip having bristles that maintain their deformed shape after a stroke). In some embodiments, the graphics application 120 may maintain the shape of the brush tool from the end of one stroke to the beginning of another stroke as the shape of the tip changes (e.g., due to the transfer of pigment from an erodible tip to the virtual canvas, the drying or reshaping of a bristle tip, etc.). As used herein, the term "stateful brush tip" or "stateful tip" refers to a tip whose state is maintained after the use of the associated tool. This persistent state may include a shape or configuration of the brush tip. In one embodiment, the state may be maintained within a single session of graphics application 120. In one embodiment, the state may be maintained from one session to another session of graphics application 120.

Figure 14:
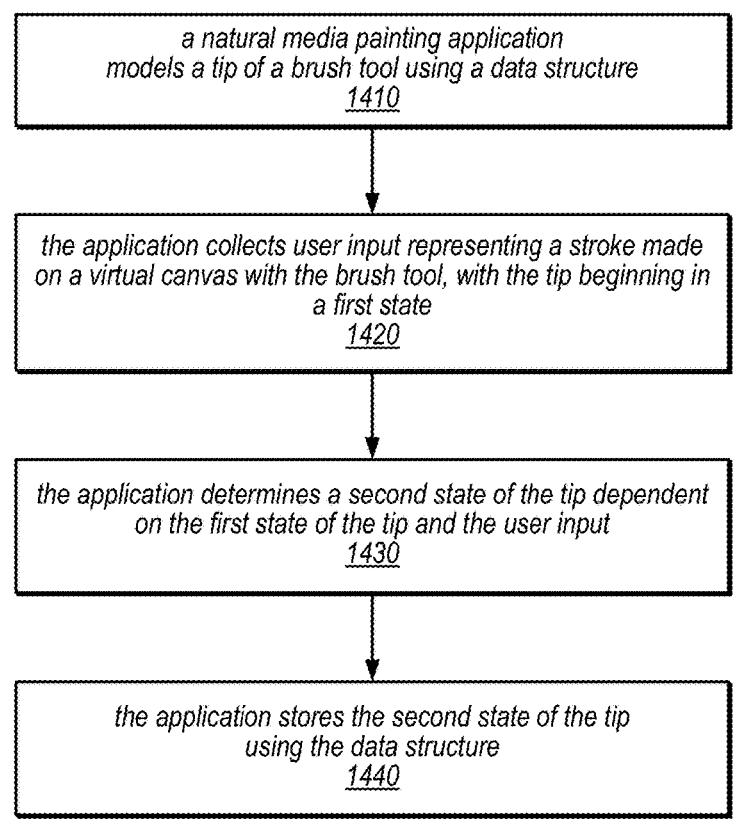
FIG. 14 is a flow diagram illustrating one embodiment of a method for simulating a stateful brush tip.

FIG. 14 is a flow diagram illustrating one embodiment of a method for simulating a stateful brush tip. The method shown in FIG. 14 may be used in conjunction with embodiments of the computer system shown in FIG. 19, among other devices. In various embodiments, any of the method elements shown in FIG. 14 may be performed by execution of a natural media painting and/or drawing application, such as graphics application 120. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

As shown in 1410, the tip of a brush tool may be modeled using a data structure. For example, the tip of the brush tool may be modeled as an erodible media using a data structure including a height map and an associated triangle mesh, as illustrated in FIG. 3 and FIGS. 10A-B. Alternatively, the tip of the brush tool may be modeled as a set of bristles with a plasticity property. As shown in 1420, a user input may be collected, where the user input represents a stroke made on a virtual canvas with the brush tool. The user input may be collected using any of the methods and systems described herein, e.g., using stylus 140 to enter data in graphics application 120. At the beginning of the stroke, the tip of the brush may be in a first state. For example, the tip may be in a state as illustrated in FIGS. 7F-7J, including a pointed (7F), flat (7G), rounded (7H), square (7I), or triangular (7J) shape. In various embodiments, at the beginning of the stroke, the tip may be in either a "sharpened" state as illustrated in FIG. 10A or a "worn" state as illustrated in FIG. 10B.

As shown in 1430, a second state of the tip may then be determined dependent on the first state of the tip and the user input. For example, the graphics application 120 may determine the wear on the tip, such as by removing the pigment that is deposited on the virtual canvas from an erodible tip. This deposition effect may be modeled using the appropriate data structure (e.g., the height map and associated triangle mesh). The second state may represent a different shape of the tip than the first state. For example, if the tip began the stroke in a "sharpened" state as illustrated in FIG. 10A, then the tip may be left in a "worn" state as illustrated in FIG. 10B after the end of the stroke. Similarly, if the tip began in a worn state, then the tip may be modified to be in a further worn state.

As shown in 1440, the second state of the tip may be stored using the data structure. In one embodiment, the graphics application 120 may update the brush model 123 to store the modified data structure representing the second state of the tip. In this manner, the state of the tip of the brush tool may be automatically maintained from stroke to stroke in a way that is seamless to the user of graphics application 120. For example, if the user makes an additional stroke on the virtual canvas with the tip of the brush tool in the "worn" second state, the deposition effect on the virtual canvas may be determined based on the worn state of the tip and not the original, unmodified state of the tip. Additionally, a third state of the tip may be determined dependent on the second state of the tip and the additional user input representing the additional stroke. The third state may represent yet another shape of the tip (e.g., a further worn state). The third state may be stored using the data structure for potential restoration in any future use of the brush tool. As will be described in greater detail below, the state of the tip may be retrieved from the stored data structure to implement additional features of a stateful brush tool.

Figure 15:
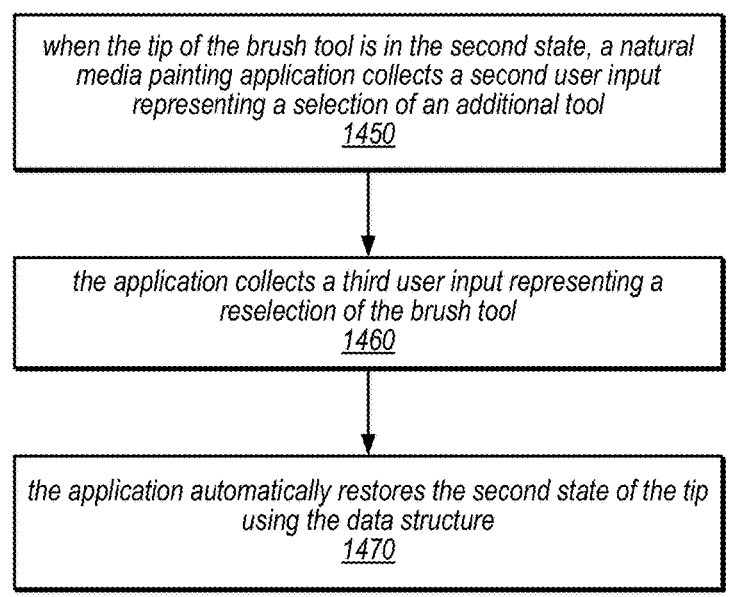
FIG. 15 is a flow diagram illustrating one embodiment of a method for restoring the state of a brush tip.

In one embodiment, the brush tip may be automatically restored to a previous state, such as after switching from the brush tool to another tool and back to the brush tool. FIG. 15 is a flow diagram illustrating one embodiment of a method for restoring the state of a brush tip. The method shown in FIG. 15 may be used in conjunction with embodiments of the computer system shown in FIG. 19, among other devices. In various embodiments, any of the method elements shown in FIG. 15 may be performed by execution of a natural media painting and/or drawing application, such as graphics application 120. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

As shown in 1450, a second user input may be collected. The second user input may represent the selection of an additional tool at a time when the tip of the brush is in the second state (e.g., a "worn" or eroded state as illustrated in FIG. 10B). In one embodiment, the additional tool may be selected by a user from a set of tools displayed in graphics application 120. In various embodiments, the additional tool may represent a different type of tool (e.g., an eraser tool, a selection tool, etc.) or a similar brush tool having a different tip shape. For example, if the brush tool used in FIG. 14 used the preset tip shape illustrated in FIG. 7F, then the additional tool may use any of the preset tip shapes illustrated in FIGS. 7G-7J. In one embodiment, the user may optionally use the additional tool to modify the image 126, select all or a portion of the image 126, etc.

As shown in 1460, a third user input may be collected. The third user input may represent a selection of the original brush tool, i.e., a reselection of the brush tool used in FIG. 14 and left in the second state prior to 1450. As shown in 1470, the second state of the tip may be automatically restored in response to collecting the third user input representing the selection of the brush tool. The second state of the tip may be restored by retrieving the state using the stored data structure. In this manner, the state of the tip of the brush tool may be automatically maintained across tool changes in a way that is seamless to the user of graphics application 120.

Figure 16:
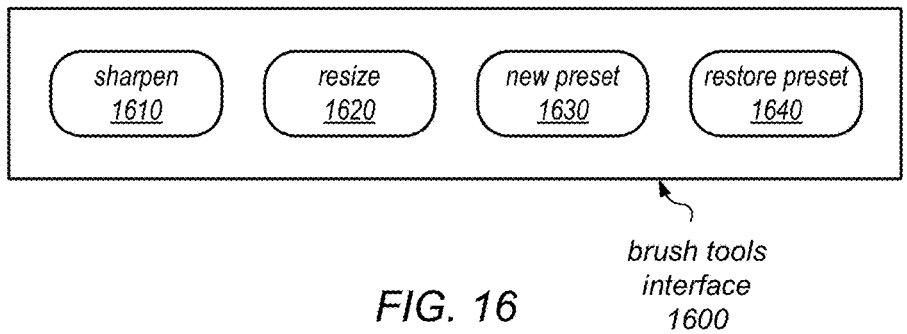
FIG. 16 is a block diagram illustrating elements of a brush tools interface for stateful brush tips, according to some embodiments.

FIG. 16 is a block diagram illustrating elements of a brush tools interface 1600 for stateful brush tips, according to some embodiments. In addition to the set of tools 202 as illustrated in FIG. 2, the tools provided in a user interface for graphics application 120 may include additional brush tools in a brush tools interface 1600. The set of brush tools illustrated in FIG. 16 is presented for purposes of example, and it is contemplated that any suitable combination of brush tools may be provided in a brush tools interface 1600.

In one embodiment, the brush tools interface 1600 may include a sharpen button 1610. By selecting the sharpen button 1610 or other appropriate interface element, the user may instruct graphics application 120 to apply a sharpen operation to the currently selected brush tool. As a result of the sharpen operation, the tip of the brush tool may be automatically restored to the default state of the brush tool. For example, if the brush tool is currently in the worn state illustrated in FIG. 10B, then the application of the sharpen operation may restore the tool to the original, unmodified state illustrated in FIG. 10A. Similarly, one of the original tip shapes illustrated in FIGS. 7F-7J may be restored from a worn version of the corresponding shape using the sharpen operation.

In one embodiment, an original brush tip provided with graphics application 120, such as the tips shown in FIGS. 7F-7J, may be generated procedurally. Such an original tip may be resized by applying the same procedural generation with a different target size. In one embodiment, a worn brush tip may also be resized such that the tip retains its degree of wear or other shape. A user instruction to resize a brush tip may be received by graphics application 120 using any suitable user interface element(s) 1620 for resizing the tip. For example, graphics application 120 may permit a user to specify a larger or smaller size for the brush tip using a slider bar, direct entry of a percentage value, etc. In one embodiment, a resize button 1620 may bring up an appropriate interface element to specify the new size. If the data structure representing the worn brush tip includes a height map and associated triangle mesh, then the height map may be sampled using linear interpolation. The height map may comprise a two-dimensional grid of pixels. A resized tip of the brush tool may then be generated using a higher or lower resolution height map based on the original height map.

In one embodiment, a worn brush tip may be stored as a customized preset shape of the brush tool. For example, a user may wear down a tip (e.g., one of the original tips shown in FIGS. 7F-7J) and then desire to store the worn tip as a default shape for later use. In one embodiment, the user may press a new preset button 1630 to store a new preset shape based on the current brush tip. The user may be permitted to name the new preset shape. A set of preset customized shapes may be stored and made available for selection by a user. The brush tool may later be restored to a selected one of the customized preset shapes. A customized preset tip may be stored and restored using the appropriate data structure for modeling the shape of the tip (e.g., a height map and associated triangle mesh). In one embodiment, a restore preset button 1640 may bring forth a restore preset interface permitting the selection of a stored preset shape.

Figure 17:
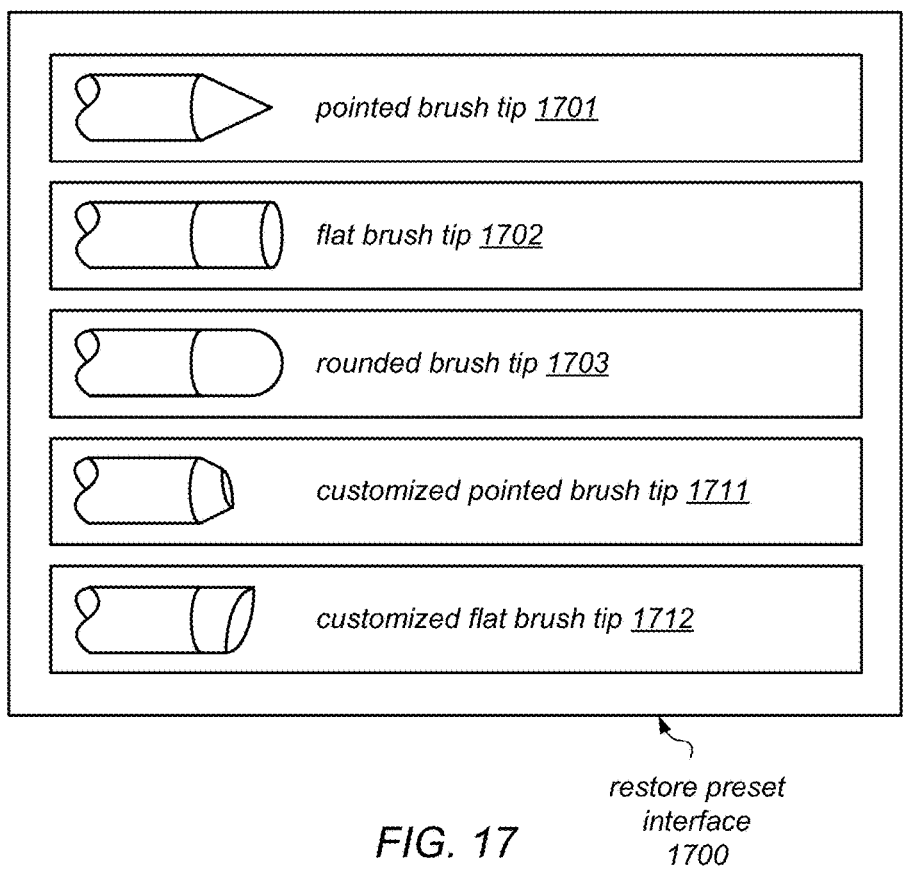
FIG. 17 is a block diagram illustrating elements of a restore preset interface for stateful brush tips, according to some embodiments.

FIG. 17 is a block diagram illustrating elements of a restore preset interface 1700 for stateful brush tips, according to some embodiments. In one embodiment, the restore preset interface may display a plurality of selectable preset shapes for a brush tool. In one embodiment, the preset shapes in the restore preset interface 1700 may include a plurality of shapes included with graphics application 120 in addition to one or more customized preset shapes, e.g., preset shapes based on worn brush tips. In another embodiment, the provided brush tips may be displayed in a different portion of the user interface for graphics application 120 than the customized brush tips. As shown in the example of FIG. 17, the restore preset interface 1700 may include predefined shapes such as a pointed brush tip 1701, a flat brush tip 1702, and a rounded brush tip 1703. In one embodiment, the brush tips 1701, 1702, 1703 may be provided with the graphics application, and their shapes may be generated procedurally. As shown in the example of FIG. 17, the restore preset interface may further include customized preset shapes such as a customized pointed brush tip 1711 and a customized flat brush tip 1712. In this example, the customized pointed brush tip 1711 was generated by wearing down the pointed brush tip 1701, and the customized flat brush tip 1712 was generated by wearing down the flat brush tip 1702. Upon a user selecting one of the customized brush tips 1711, 1712, the selected brush tip may be used for applying pigment in graphics application 120.

If one of the preset shapes is selected for use with the brush tool, the sharpen operation may restore the brush tool to the customized preset shape (e.g., customized pointed brush tip 1711) rather than to the original shape that was worn down or modified to generate the preset shape (e.g., pointed brush tip 1701). In one embodiment, the user-defined preset shapes may be saved with the application settings for re-use from session to session. In one embodiment, data representing a customized preset shape may be transferred to another instance of graphics application 120 and/or another user.

Figure 18:
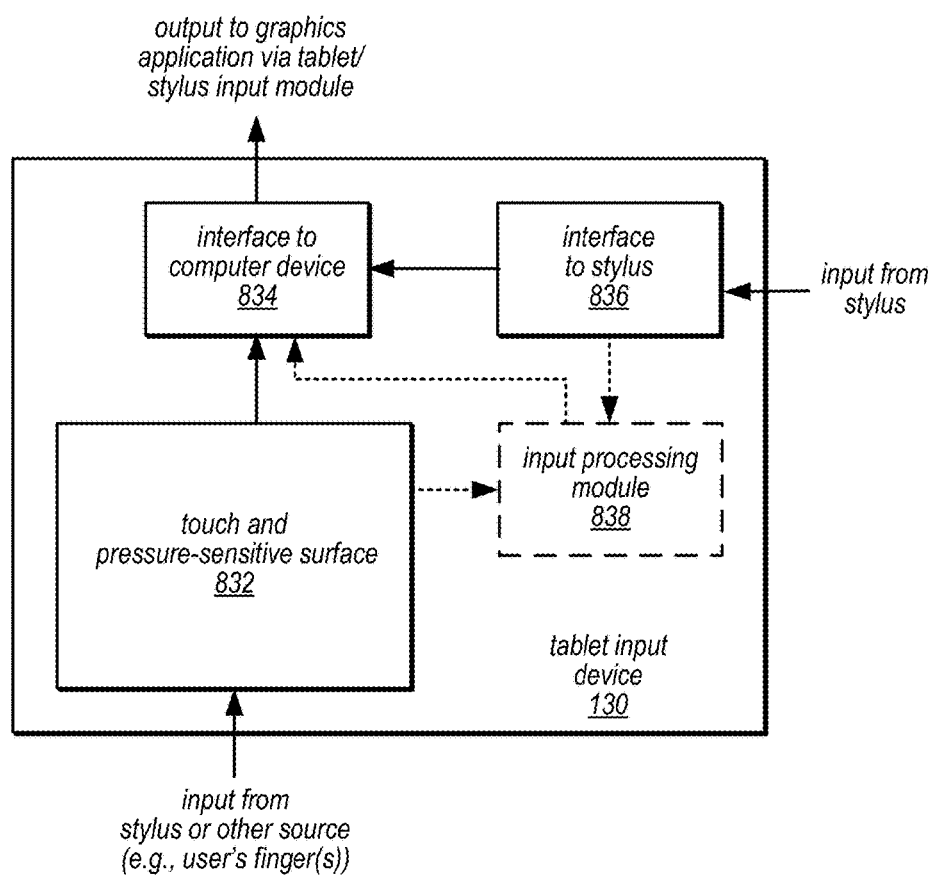
FIG. 18 illustrates various components of tablet input device, according to some embodiments.

FIG. 18 illustrates components of an example tablet input device according to some embodiments. As illustrated in this example, tablet 130 may include a touch and pressure-sensitive surface 832 that may be configured to detect contact with tip 142 of stylus 140, and/or contact with another object such as the user's fingertip or knuckle. Surface 832 may also be configured to detect motion on the surface, for example detecting the dragging of tip 142 of stylus 140 across the surface. Surface 832 may also be configured to detect the amount of pressure applied to the surface, e.g., by stylus 140, another object, or a user touch. Tablet 130 may also include an interface to stylus 836 that is configured to detect the position of, and motion of, stylus 140 in relation to tablet 130, for example by receiving input from stylus 140 via a wireless interface, or alternatively via one or more motion detectors integrated in or coupled to tablet 130 that are configured to track the motion and position of stylus 140. In some embodiments, tablet 130 and/or stylus 140 may include a camera, through which input about the position and/or motion of stylus 140 may be collected (not shown), or such a camera may included as an additional component of the system separate from tablet 130 and stylus 140. In some embodiments, tablet 130 may also include an input processing module 838 configured to process input received via interface to stylus 836 and/or surface 832.

Input processing module 838 may also include an interface to computer device 834. Interface 834 may be a wired or wireless interface. Interface 834 may be configured to communicate information collected from interface 836 and/or surface 832 to a computer device such as computer device 100 of FIG. 1. A graphics application on the computer device, such as graphics application 120 of FIG. 1, may interpret the information to detect various gestures and to perform various painting actions in response to the detected gestures for creating or editing the content of images, as described herein. In some embodiments, input processing module 838 may be configured to perform at least some of the functionality of detecting and/or recognizing various gestures. Thus, in some embodiments, tablet 130 may be configured to detect/recognize gestures and communicate the gestures to a graphics application via interface 834. The graphics application may then perform the appropriate painting actions in response to the gestures.

Some embodiments may include a means for detecting poses and gestures made using a stylus, a tablet type input device, and/or a combination of a stylus and a tablet type input device. For example, a tablet/stylus input module may present an interface through which various poses or gestures representing actions to be taken or painting effects to be applied in a natural media painting application (e.g., mode changes and/or painting operations) may be detected (e.g., using collected motion information, pressure data, etc.) and recognized, and may generate and store data representing the detected poses or gestures for use in various image editing operations in the natural media painting application, as described herein. The tablet/stylus input module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform presenting an interface through which various poses or gestures may be detected and recognized, detecting and recognizing those poses or gestures, and generating and storing data representing those poses or gestures for subsequent use in the natural media painting application, as described herein. Other embodiments of the tablet/stylus input module may be at least partially implemented by hardware circuitry and/or firmware stored, for example, in a non-volatile memory.

Some embodiments may include a means for mapping detected poses and/or gestures made using a stylus and/or tablet type input device to various functions of a natural media painting application. For example, a pose/gesture mapping module may receive input specifying various poses or gestures that have been detected, may determine actions to be taken in a natural media painting application (e.g., image editing operations to be performed using a brush tool in the application, or painting/drawing effects to be applied in the application) in response to that input, and may generate and store data representing the actions to be taken or the effects to be applied in the natural media painting application, as described herein. The pose/gesture mapping module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving input specifying various stylus poses or gestures that have been detected, determining actions to be taken or effects to be applied in a natural media painting application in response to that input, and generating and storing data representing the actions to be taken or the effects to be applied in the natural media painting application, as described herein. Other embodiments of the pose/gesture mapping module may be at least partially implemented by hardware circuitry and/or firmware stored, for example, in a non-volatile memory.

Some embodiments may include a means for simulating the behavior of various types of brushes in a natural media painting application. For example, a painting simulation module (which may include a brush model) may receive input specifying various painting actions to be performed in a natural media painting application (e.g., image editing operations to be performed using a brush tool in the application) in response to tablet and/or stylus input, and the painting simulation module may generate and store data representing an image that has been modified by the various image editing operations in the natural media painting application, as described herein. The painting simulation module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving input specifying various painting actions to be performed in a natural media painting application (e.g., image editing operations to be performed using a brush tool in the application) in response to tablet and/or stylus input, and generating and storing data representing an image that has been modified by the various image editing operations in the natural media painting application, as described herein. Other embodiments of the painting simulation module may be at least partially implemented by hardware circuitry and/or firmware stored, for example, in a non-volatile memory.

Example Computer System

Figure 19:
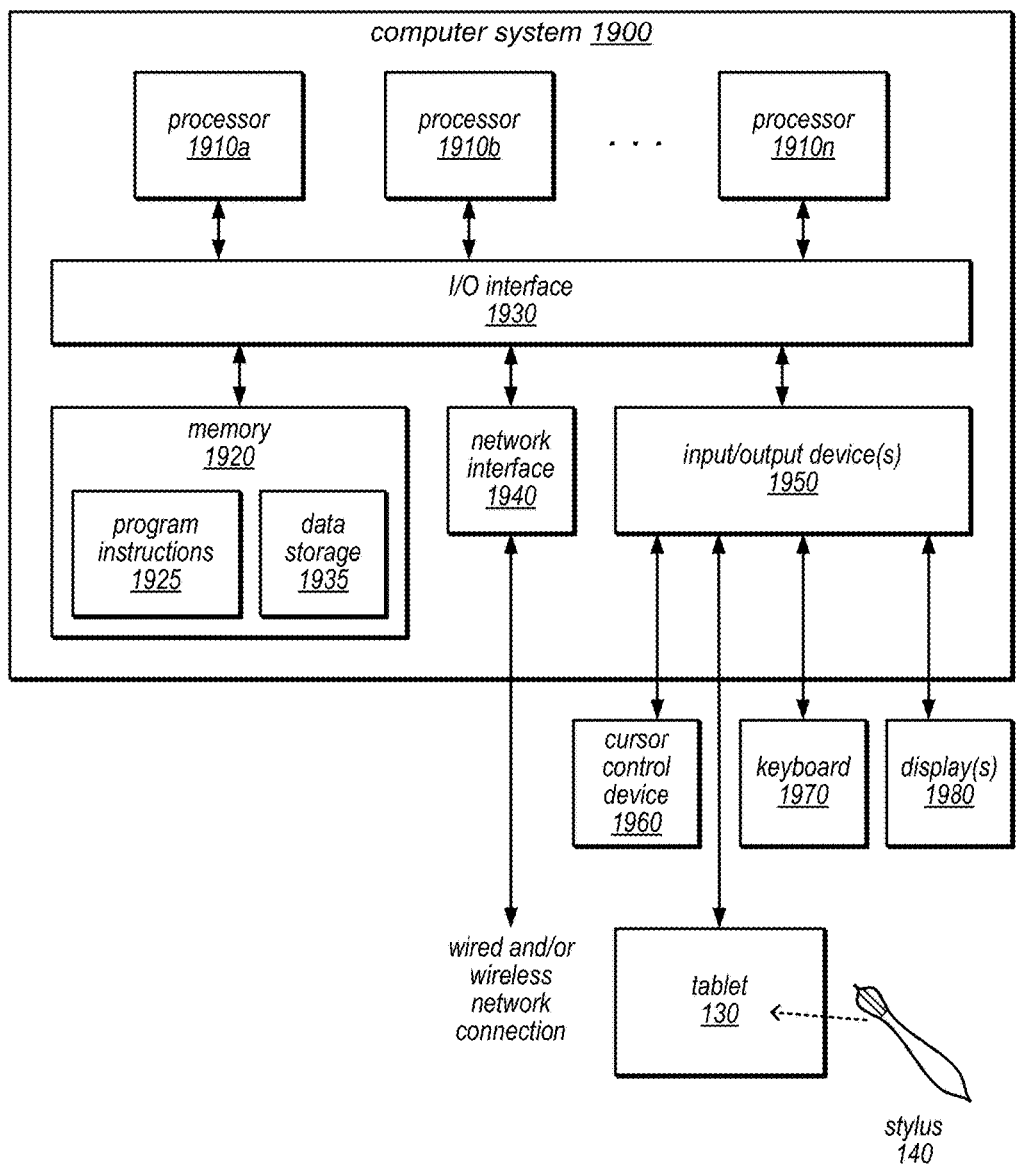
FIG. 19 is a block diagram illustrating an example computer system that may be used to implement the techniques described herein, according to some embodiments.

The methods illustrated and described herein may be executed on one or more computer systems which may interact with other devices, according to various embodiments. One such computer system is illustrated in FIG. 19. In the illustrated embodiment, computer system 1900 includes one or more processors 1910 coupled to a system memory 1920 via an input/output (I/O) interface 1930. Computer system 1900 further includes a network interface 1940 coupled to I/O interface 1930, and one or more input/output devices 1950, such as cursor control device 1960, keyboard 1970, audio device 1990, and display(s) 1980. Input/output devices 1950 include a tablet 130 and stylus 140 for enabling natural media painting using a realistic brush and tablet stylus gestures as described herein. In some embodiments, it is contemplated that embodiments may be implemented using a single instance of computer system 1900, while in other embodiments multiple such systems, or multiple nodes making up computer system 1900, may be configured to host different portions or instances of embodiments. For example, in one embodiment some elements may be implemented via one or more nodes of computer system 1900 that are distinct from those nodes implementing other elements.

In various embodiments, computer system 1900 may be a uniprocessor system including one processor 1910 or a multiprocessor system including several processors 1910 (e.g., two, four, eight, or another suitable number). Processor(s) 1910 may be any suitable processor capable of executing instructions. For example, in various embodiments, processors 1910 may be general-purpose or embedded processors implementing any of a variety of instruction set architectures (ISAs), such as the x86, PowerPC, SPARC, or MIPS ISAs, or any other suitable ISA. In multiprocessor systems, each of processors 1910 may commonly, but not necessarily, implement the same ISA.

In some embodiments, at least one processor 1910 may be a graphics processing unit. A graphics processing unit or GPU may be considered a dedicated graphics-rendering device for a personal computer, workstation, game console or other computer system. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods as illustrated and described in the accompanying description may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1920 may be configured to store program instructions and/or data accessible by processor 1910. In various embodiments, system memory 1920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those for methods as illustrated and described in the accompanying description, are shown stored within system memory 1920 as program instructions 1925 and data storage 1935, respectively. In other embodiments, program instructions and/or data may be received, sent or stored upon different types of computer-accessible media or on similar media separate from system memory 1920 or computer system 1900. Generally speaking, a computer-accessible medium may include storage media or memory media such as magnetic or optical media, e.g., disk or CD/DVD-ROM coupled to computer system 1900 via I/O interface 1930. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1940.

In one embodiment, I/O interface 1930 may be configured to coordinate I/O traffic between processor 1910, system memory 1920, and any peripheral devices in the device, including network interface 1940 or other peripheral interfaces, such as input/output devices 1950, including tablet 130 and stylus 140. In some embodiments, I/O interface 1930 may perform any necessary protocol, timing or other data transformations to convert data signals from one component (e.g., system memory 1920) into a format suitable for use by another component (e.g., processor 1910). In some embodiments, I/O interface 1930 may include support for devices attached through various types of peripheral buses, such as a variant of the Peripheral Component Interconnect (PCI) bus standard or the Universal Serial Bus (USB) standard, for example. In some embodiments, the function of I/O interface 1930 may be split into two or more separate components, such as a north bridge and a south bridge, for example. In addition, in some embodiments some or all of the functionality of I/O interface 1930, such as an interface to system memory 1920, may be incorporated directly into processor 1910.

Network interface 1940 may be configured to allow data to be exchanged between computer system 1900 and other devices attached to a network, such as other computer systems, or between nodes of computer system 1900. In various embodiments, network interface 1940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1950 may, in some embodiments, include one or more display terminals, keyboards, keypads, touchpads, scanning devices, voice or optical recognition devices, tablets and stylus, or any other devices suitable for entering or retrieving data by one or more computer system 1900. Multiple input/output devices 1950 may be present in computer system 1900 or may be distributed on various nodes of computer system 1900. In some embodiments, similar input/output devices may be separate from computer system 1900 and may interact with one or more nodes of computer system 1900 through a wired or wireless connection, such as over network interface 1940.

As shown in FIG. 19, memory 1920 may include program instructions 1925, configured to implement embodiments of methods as illustrated and described in the accompanying description, and data storage 1935, comprising various data accessible by program instructions 1925. In one embodiment, program instructions 1925 may include software elements of methods as illustrated and described in the accompanying description, including a tablet/stylus input module, painting simulation module, brush model, and/or pose/gesture mapping module. Data storage 1935 may include data that may be used by these and other modules in some embodiments. In other embodiments, other or different software elements and/or data may be included in memory 1920.

Those skilled in the art will appreciate that computer system 1900 is merely illustrative and is not intended to limit the scope of methods as illustrated and described in the accompanying description. In particular, the computer system and devices may include any combination of hardware or software that can perform the indicated functions, including computers, network devices, internet appliances, PDAs, wireless phones, pagers, etc. Computer system 1900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1900 may be transmitted to computer system 1900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the systems and methods described herein may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent examples of embodiments of methods. The methods may be implemented in software, hardware, or a combination thereof. The order of method may be changed, and various elements may be added, reordered, combined, omitted, modified, etc. Various modifications and changes may be made as would be obvious to a person skilled in the art having the benefit of this disclosure. It is intended that the disclosure embrace all such modifications and changes and, accordingly, the above description to be regarded in an illustrative rather than a restrictive sense.

What is claimed is:

1. A method, comprising:
    modeling a tip of a brush tool using a data structure, the tip representing an erodible media that includes a hardness parameter;
    receiving from an input device, a user input representing a stroke made by the brush tool on a virtual canvas, the user input defining six degrees of freedom (6DOF) data including position and orientation of the input device, wherein the stroke is initiated with the tip in a first state;
    determining a closest point of the tip to the virtual canvas, and mapping a height at which the closest point is in contact with the canvas to zero pressure;
    determining an amount of an erodible tip geometry that is below a pre-determined deposition threshold above the canvas, and creating a stamp image dependent on the determined amount of erodible tip geometry;
    determining an intensity of each pixel of the stamp dependent on a depth at which each pixel is below the pre-determined deposition threshold;
    rendering a mark for display on the virtual canvas dependent on the stamp and the determined intensity of each pixel of the stamp;
    determining a second state of the tip dependent on the first state of the tip, the user input, and the mark rendered on the virtual canvas, wherein the second state represents a worn version of the first state; and
    storing the second state of the tip using the data structure.

2. The method of claim 1, further comprising:
    receiving from the input device, a second user input representing a selection of an additional tool;
    after receiving the second user input representing the selection of the additional tool, receiving from the input device, a third user input representing a selection of the brush tool; and automatically restoring the second state of the tip using the data structure in response to receiving the third user input representing the selection of the brush tool.

3. The method of claim 1, further comprising:
receiving from the input device a second user input representing an instruction to sharpen the brush tool; and
automatically restoring the first state of the tip in response to receiving the second user input representing the instruction to sharpen the brush tool.

4. The method of claim 1, further comprising:
receiving from the input device, a second user input designating the second state of the tip as a preset shape of the brush tool;
receiving from the input device, a third user input representing an additional stroke made by the brush tool on the virtual canvas the user input defining 6DOF data including position and orientation of the input device, wherein the additional stroke is initiated using the preset shape of the tip in the second state;
determining a closest point of the tip in the second state to the virtual canvas, and mapping a height at which the closest point in the second state is in contact with the canvas to zero pressure;
determining an amount of a second state tip geometry that is below the pre-determined deposition threshold above the canvas, and creating a second stamp image dependent on the second state tip geometry;
determining an intensity of each pixel of the second stamp dependent on the depth at which each pixel is below the pre-determined deposition threshold;
rendering a second mark for display on the virtual canvas dependent on the second stamp and the determined intensity of each pixel of the second stamp;
determining a third state of the tip dependent on the second state of the tip, the third user input, and the second mark rendered on the virtual canvas, wherein the third state represents a worn version of the second state;
receiving from the input device a fourth user input representing an instruction to sharpen the brush tool; and
automatically restoring the second state of the tip in response to receiving the fourth user input representing the instruction to sharpen the brush tool.

5. The method of claim 1, further comprising:
receiving from the input device, a second user input designating the first state of the tip as a first preset shape of the brush tool;
receiving from the input device, a third user input designating the second state of the tip as a second preset shape of the brush tool;
receiving from the input device, a fourth user input selecting the first preset shape or the second preset shape; and
restoring the data structure to the selected preset shape.

6. The method of claim 1, wherein the data structure comprises a height map, and wherein the method further comprises:
receiving from the input device, a second user input comprising an instruction to resize the second state of the tip;
sampling the height map representing the second state of the tip using linear interpolation; and
generating a resized tip of the brush tool based on the sampled height map.

7. The method of claim 1, further comprising:
receiving from the input device, a second user input representing an additional stroke made by the brush tool on the virtual canvas the second user input defining 6DOF data including position and orientation of the input device, wherein the additional stroke is initiated with the tip in the second state;
determining a closest point of the tip in the second state to the virtual canvas, and mapping a height at which the closest point in the second state is in contact with the canvas to zero pressure;
determining an amount of a second state tip geometry that is below the pre-determined deposition threshold above the canvas, and creating a second stamp image dependent on the second state tip geometry;
determining an intensity of each pixel of the second stamp dependent on the depth at which each pixel is below the pre-determined deposition threshold;
rendering a second mark for display on the virtual canvas dependent on the second stamp and the determined intensity of each pixel of the second stamp;
determining a third state of the tip dependent on the second state of the tip, the second user input, and the second mark rendered on the virtual canvas, wherein the third state represents a worn version of the second state; and
storing the third state of the tip using the data structure, such that the state of the brush tool is maintained from stroke to stroke.

8. A system, comprising:
at least one processor; and
a memory coupled to the at least one processor, wherein the memory stores program instructions and a data structure, wherein the program instructions are executable by the at least one processor to:
model a tip of a brush tool using the data structure, the tip representing an erodible media that includes a hardness parameter, wherein the tip has state maintained after use of the brush tool;
receive from an input device, a user input representing a stroke made by the brush tool on a virtual canvas the user input defining 6DOF data including position and orientation of the input device, wherein the stroke is initiated with the tip in a first state;
determine a closest point of the tip to the virtual canvas, and map a height at which the closest point is in contact with the canvas to zero pressure;
determine an amount of an erodible tip geometry that is below a pre-determined deposition threshold above the canvas, and create a stamp image dependent on the determined amount of erodible tip geometry;
determine an intensity of each pixel of the stamp dependent on a depth at which each pixel is below the pre-determined deposition threshold;
render a mark for display on the virtual canvas dependent on the stamp and the determined intensity of each pixel of the stamp;
determine a second state of the tip dependent on the first state of the tip, the user input, and the mark rendered on the virtual canvas, wherein the second state represents a worn version of the first state; and
store the second state of the tip using the data structure, such that the state of the brush tool is maintained from stroke to stroke.

9. The system of claim 8, wherein the program instructions are further executable by the at least one processor to:
receive from the input device, a second user input representing a selection of an additional tool;

after receiving the second user input representing the selection of the additional tool, receive from the input device, a third user input representing a selection of the brush tool; and automatically restore the second state of the tip using the data structure in response to receiving the third user input representing the selection of the brush tool.

10. The system of claim 8, wherein the program instructions are further executable by the at least one processor to:

receive from the input device, a second user input representing an instruction to sharpen the brush tool; and automatically restore the first state of the tip in response to receiving the second user input representing the instruction to sharpen the brush tool.

11. The system of claim 8, wherein the program instructions are further executable by the at least one processor to:

receive from the input device, a second user input designating the second state of the tip as a preset shape of the brush tool;

receive from the input device, a third user input representing an additional stroke made by the brush tool on the virtual canvas the user input defining 6DOF data including position and orientation of the input device, wherein the additional stroke is initiated using the preset shape of the tip in the second state;

determine a closest point of the tip in the second state to the virtual canvas, and map a height at which the closest point in the second state is in contact with the canvas to zero pressure;

determine an amount of a second state tip geometry that is below the pre-determined deposition threshold above the canvas, and create a second stamp image dependent on the second state tip geometry;

determine the intensity of each pixel of the second stamp dependent on the depth at which each pixel is below the pre-determined deposition threshold;

render a second mark for display on the virtual canvas dependent on the second stamp and the determined intensity of each pixel of the second stamp;

determine a third state of the tip dependent on the second state of the tip, the third user input, and the second mark rendered on the virtual canvas wherein the third state represents a worn version of the second state;

receive from the input device, a fourth user input representing an instruction to sharpen the brush tool; and automatically restore the second state of the tip in response to receiving the fourth user input representing the instruction to sharpen the brush tool.

12. The system of claim 8, wherein the program instructions are further executable by the at least one processor to:

receive from the input device, a second user input designating the first state of the tip as a first preset shape of the brush tool;

receive from the input device, a third user input designating the second state of the tip as a second preset shape of the brush tool;

receive from the input device, a fourth user input selecting the first preset shape or the second preset shape; and restore the data structure to the selected preset shape.

13. The system of claim 8, wherein the data structure comprises a height map, and wherein the program instructions are further executable by the at least one processor to:

receive from the input device, a second user input comprising an instruction to resize the second state of the tip;

sample the height map representing the second state of the tip using linear interpolation; and generate a resized tip of the brush tool based on the sampled height map.

14. The system of claim 8, wherein the program instructions are further executable by the at least one processor to:

receive from the input device, a second user input representing an additional stroke made by the brush tool on the virtual canvas the user input defining 6DOF data defining position and orientation of the input device, wherein the additional stroke is initiated with the tip in the second state;

determine a closest point of the tip in the second state to the virtual canvas, and map a height at which this point in the second state is in contact with the canvas to zero pressure;

determine an amount of a second state tip geometry that is below the pre-determined deposition threshold above the canvas, and create a second stamp image dependent on the second state tip geometry;

determine an intensity of each pixel of the second stamp dependent on the depth at which each pixel is below the pre-determined deposition threshold;

render a second mark for display on the virtual canvas dependent on the second stamp and the determined intensity of each pixel of the second stamp;

determine a third state of the tip dependent on the second state of the tip, the second user input, and the second mark rendered on the virtual canvas, wherein the third state represents a worn version of the second state; and store the third state of the tip using the data structure, such that the state of the brush tool is maintained from stroke to stroke.

15. A non-transitory, computer-readable storage medium storing program instructions that when executed on one or more computers cause the one or more computers to perform:

modeling a tip of a brush tool using a data structure, the tip representing an erodible media that includes a hardness parameter, wherein the tip has state maintained after use of the brush tool;

receiving from an input device, a user input representing a stroke made by the brush tool on a virtual canvas the user input defining 6DOF data including position and orientation of the input device, wherein the stroke is initiated with the tip in a first state;

determining a closest point of the tip to the virtual canvas, and mapping a height at which the closest point is in contact with the canvas to zero pressure;

determining an amount of an erodible tip geometry that is below a pre-determined deposition threshold above the canvas, and creating a stamp image dependent on the erodible tip geometry;

determining an intensity of each pixel of the stamp dependent on a depth at which each pixel is below the pre-determined deposition threshold;

rendering a mark for display on the virtual canvas dependent on the stamp and the determined intensity of each pixel of the stamp;

determining a second state of the tip dependent on the first state of the tip and the user input, wherein the second state represents a worn version of the first state; and storing the second state of the tip using the data structure, such that the state of the brush tool is maintained from stroke to stroke.

16. The non-transitory, computer-readable storage medium of claim 15, wherein the program instructions when executed on the one or more computers further cause the one or more computers to perform:

receiving from the input device, a second user input representing a selection of an additional tool;

after receiving the second user input representing the selection of the additional tool, receiving from the input device, a third user input representing a selection of the brush tool; and automatically restoring the second state of the tip using the data structure in response to receiving the third user input representing the selection of the brush tool.

17. The non-transitory, computer-readable storage medium of claim 15, wherein the program instructions when executed on the one or more computers further cause the one or more computers to perform:

receiving from the input device, a second user input representing an instruction to sharpen the brush tool; and automatically restoring the first state of the tip in response to receiving the second user input representing the instruction to sharpen the brush tool.

18. The non-transitory, computer-readable storage medium of claim 15, wherein the program instructions when executed on the one or more computers further cause the one or more computers to perform:

receiving from the input device, a second user input designating the second state of the tip as a preset shape of the brush tool;

receiving from the input device, a third user input representing an additional stroke made by the brush tool on the virtual canvas the user input defining 6DOF data including position and orientation of the input device, wherein the additional stroke is initiated using the preset shape of the tip in the second state;

determining a closest point of the tip in the second state to the virtual canvas, and mapping a height at which the closest point in the second state is in contact with the canvas to zero pressure;

determining an amount of a second state tip geometry that is below the pre-determined deposition threshold above the canvas, and creating a second stamp image dependent on the second state tip geometry;

determining an intensity of each pixel of the second stamp dependent on the depth at which each pixel is below the pre-determined deposition threshold;

rendering a second mark for display on the virtual canvas dependent on the second stamp and the determined intensity of each pixel of the second stamp;

determining a third state of the tip dependent on the second state of the tip, the third user input, and the second mark rendered on the virtual canvas, wherein the third state represents a worn version of the second state;

receiving from the input device, a fourth user input representing an instruction to sharpen the brush tool; and automatically restoring the second state of the tip in response to receiving the fourth user input representing the instruction to sharpen the brush tool.

19. The non-transitory, computer-readable storage medium of claim 15, wherein the program instructions when executed on the one or more computers further cause the one or more computers to perform:

receiving from the input device, a second user input designating the first state of the tip as a first preset shape of the brush tool;

receiving from the input device, a third user input designating the second state of the tip as a second preset shape of the brush tool;

receiving from the input device, a fourth user input selecting the first preset shape or the second preset shape; and restoring the data structure to the selected preset shape.

20. The non-transitory, computer-readable storage medium of claim 15, wherein the data structure comprises a height map, and wherein the program instructions when executed on the one or more computers further cause the one or more computers to perform:

receiving from the input device, a second user input comprising an instruction to resize the second state of the tip;

sampling the height map representing the second state of the tip using linear interpolation; and generating a resized tip of the brush tool based on the sampled height map.

* * * * *